United States Patent
Aylward et al.

(10) Patent No.: US 6,690,816 B2
(45) Date of Patent: Feb. 10, 2004

(54) SYSTEMS AND METHODS FOR TUBULAR OBJECT PROCESSING

(75) Inventors: Stephen R. Aylward, Carrboro, NC (US); Elizabeth Bullitt, Durham, NC (US); Stephen M. Pizer, Chapel Hill, NC (US); Daniel Fritsch, Chapel Hill, NC (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 93 days.

(21) Appl. No.: 09/828,200

(22) Filed: Apr. 9, 2001

(65) Prior Publication Data

US 2003/0053697 A1 Mar. 20, 2003

Related U.S. Application Data

(60) Provisional application No. 60/215,115, filed on Jun. 29, 2000, and provisional application No. 60/195,200, filed on Apr. 7, 2000.

(51) Int. Cl.[7] ................................................. G06K 9/00
(52) U.S. Cl. ........................................ 382/128; 600/407
(58) Field of Search ................................ 382/128, 129, 382/130, 131, 154, 173, 180; 128/922, 206.26, 856; 600/407, 209, 425, 426, 429

(56) References Cited

U.S. PATENT DOCUMENTS

| | | | | |
|---|---|---|---|---|
| 5,768,405 A | * | 6/1998 | Makram-Ebeid | 382/128 |
| 5,891,030 A | * | 4/1999 | Johnson et al. | 600/407 |
| 6,169,917 B1 | * | 1/2001 | Masotti et al. | 600/407 |
| 6,212,420 B1 | * | 4/2001 | Wang et al. | 600/407 |
| 6,246,784 B1 | * | 6/2001 | Summers et al. | 382/128 |
| 6,381,586 B1 | * | 4/2002 | Glasserman et al. | 705/35 |

FOREIGN PATENT DOCUMENTS

| | | |
|---|---|---|
| WO | WO 98/37517 | 8/1998 |
| WO | WO 00/55814 | 9/2000 |

\* cited by examiner

*Primary Examiner*—Jayanti K. Patel
*Assistant Examiner*—Abolfazl Tabatabai
(74) *Attorney, Agent, or Firm*—Jenkins, Wilson & Taylor, P.A.

(57) ABSTRACT

Systems and methods are disclosed for processing tubular objects in multi-dimensional images. The processing includes generating representations of tubular objects which enable subsequent analysis. Systems and methods for processing tubular objects in a multi-dimensional image include establishing a seed points in a multi-dimensional image, searching for an extremum point corresponding to a tubular object having a central curve of intensity extrema, and extracting a one-dimensional central track corresponding to the tubular object and extents corresponding to a plurality of cross-sections along the tubular object. A number of embodiments are presented which apply the systems and methods to a variety of imaging applications.

32 Claims, 19 Drawing Sheets

SYSTEMS AND METHODS FOR TUBULAR OBJECT PROCESSING

This application claims the priority of U.S. Provisional Application Serial No. 60/215,115, filed Jun. 29, 2000 and U.S. Provisional Application Serial No. 60/195,200 filed Apr. 7, 2000. The contents of the above applications are relied upon and expressly incorporated herein by reference.

FIELD OF THE INVENTION

The present invention is directed generally to image processing systems and methods, and more particularly, to systems and methods for processing images to represent and analyze at least one tubular-shaped object.

BACKGROUND OF THE INVENTION

Tubular-shaped objects, herein referred to as tubular objects, may be found in image data in a variety of imaging applications. For example, tubular objects may be commonly found in medical images. Examples of tubular objects in medical images may include vessels, bronchi, bowels, ducts, nerves and specific bones. Representation and analysis of tubular objects in medical images can aid medical personnel in understanding the complex anatomy of a patient and facilitate medical treatments. Remote sensing is another example application. Images of terrain containing natural features, for example, rivers and/or streams, and/or man-made features, such as tunnels and/or roads, may also be considered tubular objects. Representation and analysis of tubular objects in the remote sensing application may be useful in the creation of digital maps. Tubular objects may exist in many other diverse imaging applications, such as, for example, integrated circuit manufacturing, electron microscopy, etc. Processing of tubular objects in any of these imaging applications may provide information to maximize the utility of these images.

Known approaches for generating representations of objects in images include techniques characterized as "model-based" and "model-free." Model-based methods can be difficult to apply to most tubular object representation and analysis tasks since the global arrangement of most tubular objects varies significantly from image to image. For example, in medical imaging, the coiling of the bowel or a kidney's vascular tree varies significantly from patient to patient. There typically is not a one-to-one correspondence between the arrangement of most vessels among different patients.

Model-free techniques include thresholding, region growing, morphological, and image filtering techniques. Global threshold techniques can lack feasibility for extracting vessels from Magnetic Resonance Angiograms (MRAs) due to large-scale intensity variations which may occur in that imaging modality. Region growing methods appear to have difficulties with small vessels, especially for "one-voxel" vessels whose diameter is approximately the resolution of the imaging device. Additionally, thresholding and region growing methods may sometimes not be stable and may not form representations of tubes. Morphological and image filtering techniques may assume that a fixed, basic shape has been extruded along a path to generate an object. Such methods can be over-constrained and present a difficulty in handling a wide range of tube sizes and/or variations in cross-sectional intensities. While these methods can form symbolic representations, the stability and utility of the symbolic representations remains to be developed.

Available techniques for tubular object representation may be unable to form stable representations in the presence of noise, be computationally inefficient, unable to provide three-dimensional connectivity information, exploit the geometry of tubes and scale invariance, or operate independently of the data source.

In view of the foregoing, there is a need for an improved system and method for stable, accurate, and fast representation and analysis of tubular objects in multi-dimensional images.

SUMMARY

The present invention provides a system and method for processing a multi-dimensional image containing at least one tubular object.

As embodied and broadly described herein, certain aspects of the invention are directed to a system which processes at least one tubular object found in a multi-dimensional image.

In one aspect of the invention, a method for processing at least one tubular object in a multi-dimensional image is presented which includes establishing a seed point in a multi-dimensional image, searching for an extremum point corresponding to a tubular object having a central curve of intensity extrema, and extracting: 1) a one-dimensional central track corresponding to the tubular object, and 2) extents corresponding to a plurality of cross-sections along the tubular object, where the plurality of cross-sections intersects the central track.

In another aspect of the invention, a method for processing at least one tubular objects in a multi-dimensional image is presented which includes establishing a seed point in a multi-dimensional image, searching for an extremum point corresponding to a tubular object having a central curve of intensity extrema, extracting: 1) a one-dimensional central track corresponding to the tubular object, and 2) extents corresponding to a plurality of cross-sections along the tubular object, where the plurality of cross-sections intersects the central track, generating symbolic representations of the tubular object, and optionally performing at least one of a set operation, a numeric operation, and a graph operation on the symbolic representations.

In another aspect of the invention, a system for processing at least one tubular object in a multi-dimensional image is presented which includes a computer processor, a memory functionally coupled to the computer processor, wherein the memory stores a multi-dimensional image and instructions to be executed by the computer processor, for establishing a seed point in the multi-dimensional image, searching for an extremum point corresponding to a tubular object having a central curve of intensity extrema, and extracting: a) a one-dimensional central track corresponding to the tubular object, and b) extents corresponding to a plurality of cross-sections along the tubular object, where the plurality of cross-sections intersects the one-dimensional central track.

In another aspect of the invention, a system for processing at least one tubular object in a multi-dimensional image is presented which includes a computer processor, a memory functionally coupled to the computer processor, wherein the memory stores a multi-dimensional image and instructions to be executed by the computer processor, for establishing a seed point in the multi-dimensional image, searching for an extremum point corresponding to a tubular object having a central curve of intensity extrema, extracting: a) a one-dimensional central track corresponding to the tubular object, and b) extents corresponding to a plurality of cross-sections along the tubular object, where the plurality of cross-sections intersects the one-dimensional central track, generating symbolic representations of the tubular object, and optionally performing at least one of a set operation, a numeric operation, and a graph operation on the symbolic representations.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate several embodiments of the invention and together with the description, serve to explain some of the principles of the invention.

DETAILED DESCRIPTION

Reference will now be made in detail to the exemplary embodiments of the present invention, examples of which are illustrated in the accompanying drawings. Wherever possible, the same reference numbers will be used throughout the drawings to refer to the same or like parts.

Properties of Tubular Objects

Tubular objects can exist in N-dimensional (N-D) image data and include three basic geometric properties: 1) a tubular object may be described by a 1-D central track that forms a forms a smooth 1-D central curve in N-D, 2) orthogonal to the central track are approximately circular cross-sections which vary smoothly along the central track, and 3) a tubular object can subdivide, or branch, to form a plurality of tubular objects.

Central curves of intensity extrema may naturally exist along the center of tubular objects. These extrema may constitute a maximum, and therefore form an intensity ridge, or they may be an intensity minimum, and therefore represent an intensity valley. Such extrema may result, for example, from the flow properties of blood through vessels, or as a result of image acquisition processes. In situations where the central curve of intensity extrema is not naturally present, such as, for example, when tubular objects appear in the presence of noise or when the tube is differentiated from its background by texture, linear and non-linear processing operations may create it. When tubular objects are defined by intensity contrast, they may have a special property in that convolutional filtering can produce a central curve of intensity extrema when one does not naturally exist. Furthermore, this central curve closely approximates the 1-D central track which can be used to represent the tubular object. As will be described in detail below, this property of tubular objects may be used to aid in determining the tubular object's 1-D central track.

Figure 1A:
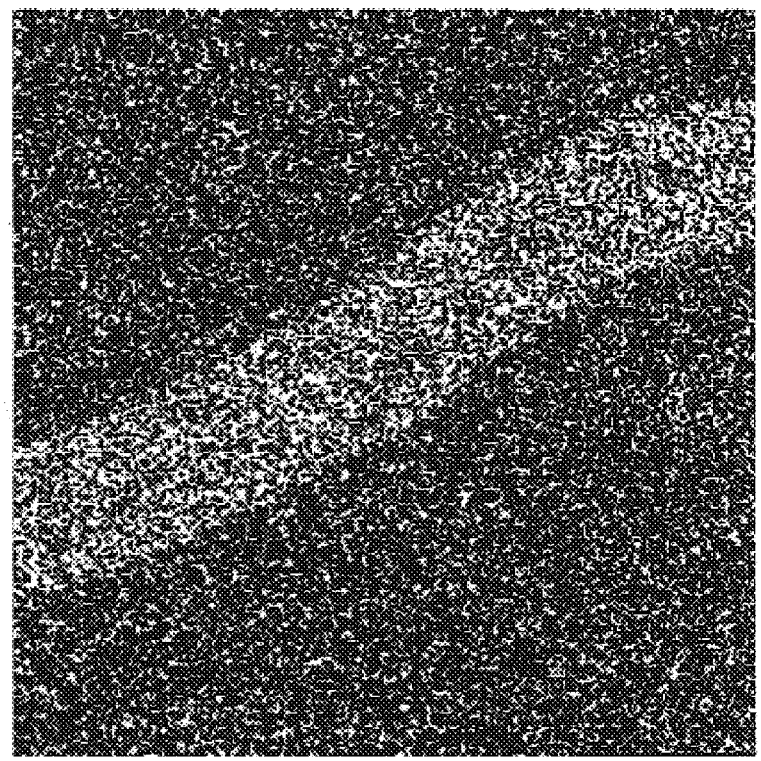
FIG. 1A shows a two dimensional image containing a uniform intensity stripe in the presence of additive noise.
Figure 1B:
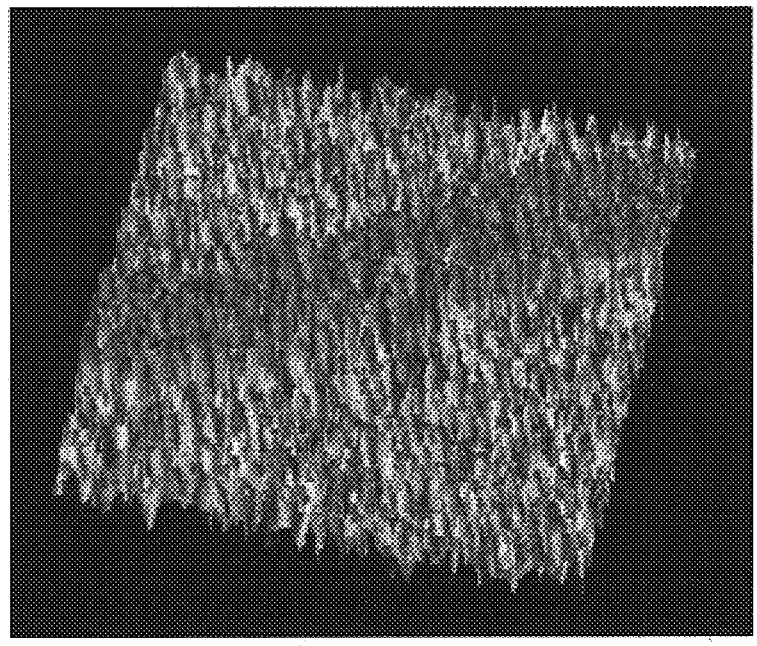
FIG. 1B shows a height-surface rendering of the image in FIG. 1A.
Figure 2A:
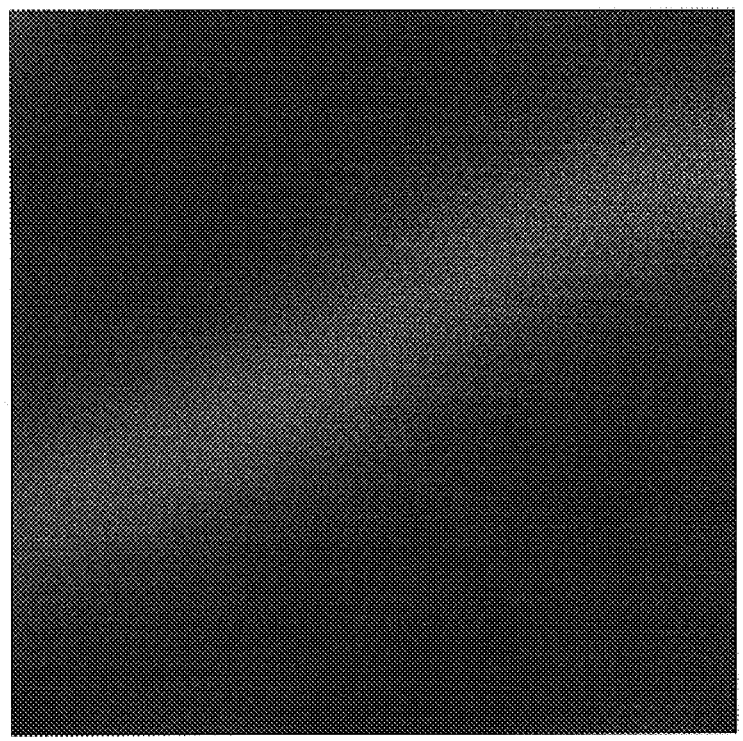
FIG. 2A shows the result of a Gaussian filter convolved with the image in FIG. 1A.
Figure 2B:
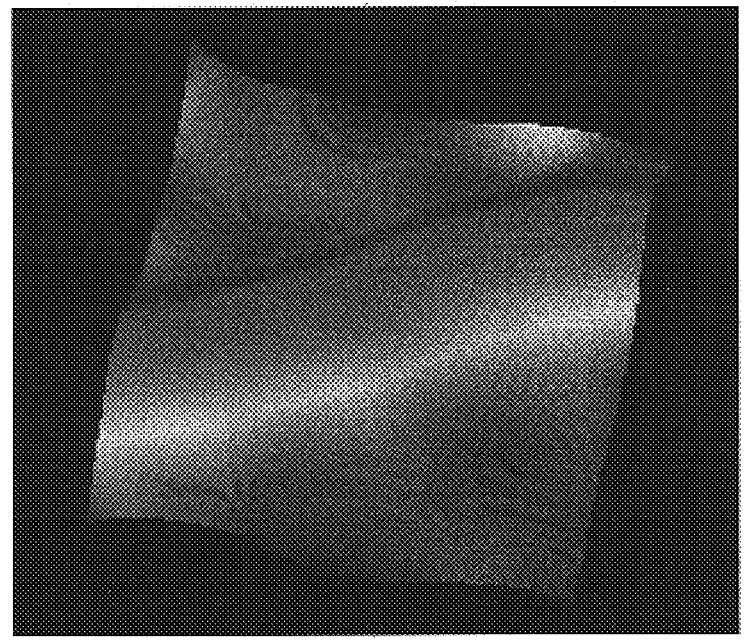
FIG. 2B is a rendering of the height surface of FIG. 2A permitting the central track to be visualized.

FIGS. 1A, 1B, 2A, and 2B illustrate the special property of tubular objects described above. Referring to FIG. 1A, a 2-D image containing a uniform intensity stripe, which can be described as a 2-D tubular object, is shown. Gaussian noise has been added to the image, and as a result, the central curve of intensity extrema does not exist. FIG. 1B shows a height surface rendering of the same image wherein the image intensities of the 2-D image of FIG. 1A correspond to height. Again, no central curve of intensity extrema can be perceived. FIG. 2A shows the result of convolving the image shown in FIG. 1A with a filter having a Gaussian kernel, whose kernel size is approximately the width of the tube. Stated in an alternative manner, the scale of the filter is closely related to the tube. Convolving the image with a filtering kernel at any of a range of scales related to the width of a tubular object can produce a central curve of intensity extrema, and thus create a curve approximating the 1-D central track corresponding to the tubular object. This intensity extrema can be seen in the filtered image shown in FIG. 2A and in the height surface rendering of the filtered image shown in FIG. 2B.

For purposes of this document, scale may be defined as a spatial metric quantifying the amount of space used to make a particular measurement or observation of a tubular object. In one example of the present invention, one may change the scale used to process tubular objects by changing the size of the filter kernel. Therefore, scale can be quantified as the number of image elements (e.g., pixels for 2-D images and voxels for 3-D images). However, it may be preferable to quantify scale as a ratio of the size of the filter kernel to the extent of a cross-section of a tubular object of interest. Quantifying scale in this manner allows one to focus on the relationship between the tubular objects and the filter sizes irrespective of the sample spacing in the image. The exact relationship between an optimal scale for tubular objects of a particular cross-sectional extent may be application specific. The scale can range from the resolution of the image, also known as the inner scale, to an order of magnitude times the cross-sectional extent of a tubular object of interest. For medical applications, where most vessels typically are sparsely distributed in 3-D images, for example, a ratio of 1:1 may be used for cross-sectional extent to filter kernel size. However, in some applications wherein tubular objects are directly adjacent other structures, a smaller scale may be used so the adjacent structure's intensity is not integrated into the tube's intensity, potentially corrupting the detection of the central curve of intensity extrema. As an example, for the small bowel that is densely packed with neighboring structures that can interfere with large-scale filtering, using a scale that is ½ the width may produce acceptable results.

Ranges of scale, or scale space, have been studied in depth. If there are no neighboring structures or image edges that interfere with the convolution process, the center of a circularly symmetric object will have a central extremum whose spatial location remains unchanged for all convolutions with Gaussian kernels at the scale of that object or larger. Dependent on the noise in the image, (e.g., background noise, small-scale boundary irregularities, and noise affecting the intensities internal to the object), the central extremum can also exist and be consistent for most of blurring scales below the width of the object. In general, the Gaussian kernel, by performing a weighted integration over a large area, may be able to make the position of the central extremum relatively insensitive to a wide range of disturbances, thus allowing for a high degree of stability within the measurements.

Figure 3:
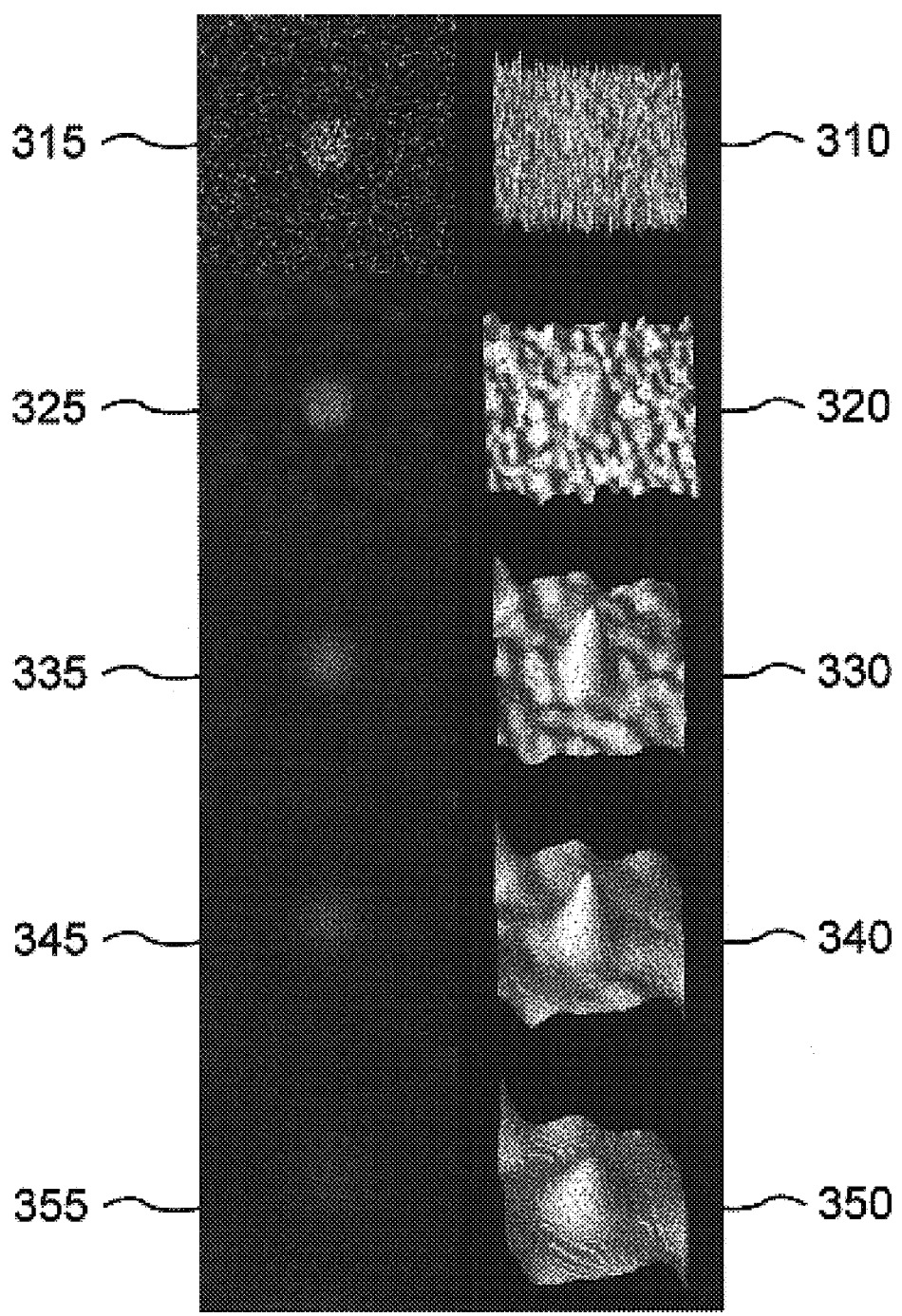
FIG. 3 is an image depicting representations of a disc with Gaussian noise and Gaussian filtering with different scales applied.

The stability of a central track is illustrated in FIG. 3. Here, a uniform intensity disk has been inserted into a uniform intensity background having a slightly lower intensity. A significant amount of noise was then added into the composite image, as shown by image 315 and height surface map 310. Images 325, 335, 345, and 355 were filtered with a Gaussian kernel having scales of 0.2, 0.4, 0.6, and 1.0, respectively. Each of the successive images, along with their respective height surface maps 320, 330, 340, and 350 show the stability of a central extremum. Noteworthy is that over a large range of scales, the central extremum exists and has a consistent spatial location. This stability may be referred to as a scale-space invariance of the central extremum.

Experimentation with real image data also shows the method to be relatively insensitive to the blurring scale. For example, most vessels in an MRA of a brain can be extracted using blurring scales ranging from 0.5 to over 2.

PROCESSING EXAMPLES

Figure 4:
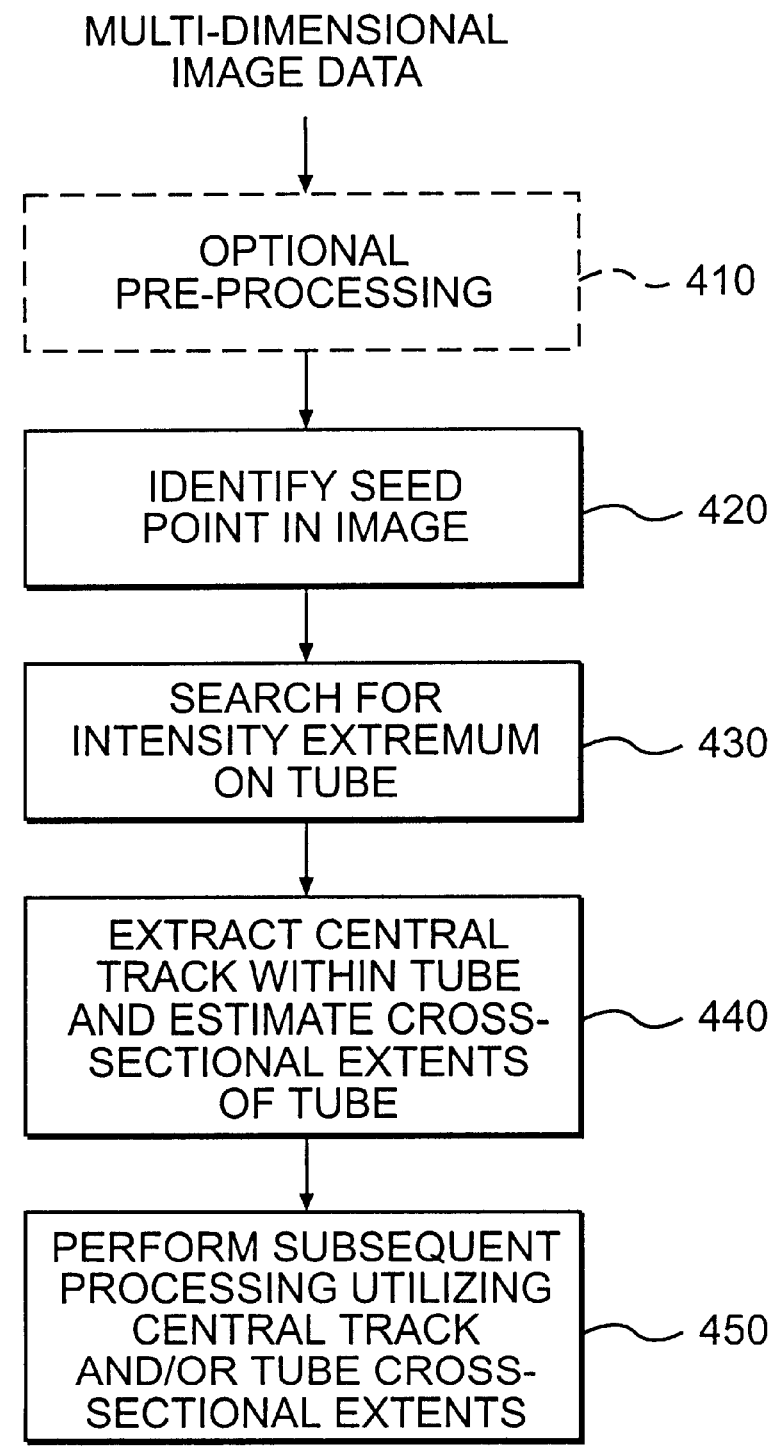
FIG. 4 is a top level flow chart showing a method according to an example of the invention for extracting a representation for a tubular object within a multi-dimensional image.

FIG. 4 is a top-level flow diagram showing an example of a method 400 for representing tubular objects. The illustrated embodiment depicts a general-purpose method which may be used with any type of image data. According to this example, tubular object geometry is incorporated into an extraction process. The extraction process preferably utilizes this geometry in a manner that is invariant to rotation, translation, zoom, and contrast and that is insensitive to background, boundary, and object noise.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc.

Method 400 may initially start with an optional pre-processing step to pre-condition the image data (step 410). A seed-point may then designated at or near a tubular object of interest (step 420). From the seed point, a search may be performed to find a extremum point on the central curve of intensity extrema (step 430). Once the extremum point is established, a 1-D central track and cross-sectional extent may be extracted at discrete points along the tubular object's length (step 440). This extraction is done using an adaptive scale. The scale value used to locally filter image data for a future point is based on the cross-sectional extent of the tubular object at the current point. This adaptive scale may provide for the optimal extraction of tubular objects which have different cross-sectional extents. The resulting 1-D central track may be expressed as an ordered sequence of points representing positions in a coordinate system associated with the image. Afterward, subsequent processing may be performed on the tubular objects utilizing the 1-D central track and/or the set of cross-sectional extent parameters. These parameters may serve to stabilize subsequent processing for object-based analysis and display. For example, the 1-D track may be displayed in isolation or overlaid on other images. Such processing may also include symbolic processing, wherein each 1-D central track is treated as a singular data object. Symbolic processing can produce a description of the relationships between individual tubular objects so quantitative relational information among tubular objects is known. Such information can include how tubular objects interconnect, at what locations these interconnections occur within the image, and the direction of flow of materials within the tubular object. For example, if the tubular objects represented streets in a digital map, symbolic processing could determine a valid path between one point on a tubular object and another given a set of rules (such rules could take into account involving only connected streets without taking invalid one-way streets, or jumping through a building to reach a disconnected street). Another example would be describing blood flow through a connected network of blood vessels. A more detailed description of method 400 is presented below.

Further referring to FIG. 4, each step is now described in more detail. Image data may initially undergo an optional pre-processing stage (step 410). One form of optional pre-processing is convolving the entire image with a filter to produce central curves of intensity extrema in tubular objects as described above. The filter may be a Gaussian kernel with a fixed scale which is chosen by the user; however, other filter kernels known to those skilled in the art may be used. The fixed scale of the filter may be chosen to optimally process tubular objects having a given cross-sectional extent of interest to the user. This form of pre-processing is typically used when the user is only interested in tubular objects of certain cross-sectional extent. The approach may be to use filters with an adaptive scale to optimally extract tubes of varying cross-sectional extents, as will be described in more detail below.

Optional pre-processing may be performed simply to reduce the amount of noise present in the image if the image quality is poor. Such noise reduction filtering could use linear or non-linear filtering techniques known to those skilled in the art. Another processing type which may be performed as pre-processing step 410 is shape conversion processing. During shape conversion processing, non-tubular objects are transformed into tubular objects, or objects which are substantially tubular. This type of processing can be used to extend the utility of method 400. For example, certain image operators can transform corners into zones of tubular shaped points. Using these operators, the method 400 can be used to identify corners.

Further referring to FIG. 4, the next step is to designate a tubular object of interest by identifying seed points in the image (step 420). Seed points are starting locations in the image where tubular object extraction begins and are preferably designated near the 1-D central track of interest. A scale may also be provided which should be optimal to produce the central curve of intensity. A mentioned above, this optimal scale is typically the approximate cross-sectional extent of the tubular object of interest. The seed point identification and the scale specification may be manually or automatically performed.

For manual seed point identification, a user may specify one or more locations on or near a tubular object of interest. This may be accomplished through a graphical user interface. Typically, the user will indicate the location of the seed point by placing a cursor at the location as shown on a displayed image. Alternatively, the user may specify the point numerically by specifying the coordinates of the location in a reference system associated with the image. The user may also indicate a scale value which may be used in determining an extremum point on the central curve of intensity extrema. Alternatively, a scale value may be determined automatically by convolving the image in the vicinity of the seed point using a range of scales, and choosing the scale which maximizes the filter's output. In the event a non-optimal scale is specified, either automatically or by the user, the scale-space invariance of the central curve of intensity extrema will allow an extremum point to be consistently determined. For manual designation, this permits operators with a broad range of user-skill to effectively utilize the method.

There are a number of different types of automatic seed point identification techniques which can designate one or more tubular objects of interest for extraction. These techniques differ in the assumptions they make regarding the relative configurations of the tubular objects, and thereby differ in the processing time for analyzing an image. One technique makes no assumptions regarding how the tubes are interconnected. A second technique assumes the tubes form a tree, thereby significantly reducing processing time by reducing the extent of the image which is searched. These processes may be termed the extract-all and the extract-tree processes, respectively, and are described in detail below. Both methods search for tube seed points with respect to a fixed scale or a set range of scales. In general, these processes are preferably tuned for a given application and an imaging modality to which the application is applied. Because the automatic extraction methods have the potential to generate a large number of seed points which may not be in the vicinity of a tubular object, each point is tested utilizing tubular extrema criteria to make sure the point is proximal to a tubular object before subsequent processing occurs. The tubular extrema criteria is described in detail below.

Tubular Extrema Criteria

Tubes can be defined by contrast differences from the background image data. Typically, tubes of interest appear brighter than the background, therefore, their central curve of intensity extrema are usually "ridges" and not "valleys." As a result, the equations used to evaluate the tubular extrema criteria were developed to test for points located at ridges. However, these equations could easily be used to test for points at valleys by a sign change on the second criteria equation listed below.

Parameters associated with the tubular extrema criteria may be defined as follows: I is an N-D dataset, x is a N-D point on a 1-D ridge, $\sigma$ is a scale at which image measurements are taken, $\vec{\nabla} I$ is the gradient vector of I at x, $\nabla_{\vec{n}}^2 I$ is a second derivative of I at x in the direction of $\vec{n}$, $\vec{n}_1 \ldots \vec{n}_{N-1}$ are a set of N−1 vectors normal to the ridge at x, and $\vec{t}$ is a vector tangent to the ridge at x. The following three conditions should hold for a point to be on a central curve of intensity extrema, which has a maximum intensity, for a tubular object having a approximately circular cross section. Note that each of these equations are evaluated after the image elements have been convolved with a filter at a scale $\sigma$. The preferred filter kernel is circularly shaped having Gaussian distributed weights.

(1) The point may be a local maximum in the N−1 direction normal to the ridge (i.e., the point may be in the center of an extremum, not on either side):

$$\sum_{i=1}^{N-1} \vec{n}_i \cdot \vec{\nabla} I \approx 0.$$

(2) The point may be on a ridge, not in a valley or a saddle point; therefore, the second derivatives would be negative in the directions normal to the ridge:

$$\nabla_{\vec{n}_i}^2 I < 0, \text{ where } i=1, \ldots, N-1.$$

(3) The tubular object's cross-section may be substantially circular, that is, the region about the ridge point may be approximately symmetric:

$$\frac{\min(\nabla_{\vec{n}_1}^2 I, \ldots, \nabla_{\vec{n}_{N-1}}^2 I)}{\max(\nabla_{\vec{n}_1}^2 I, \ldots, \nabla_{\vec{n}_{N-1}}^2 I)} \geq 1 - \varepsilon.$$

Less critical parameters of the tubular extrema criteria are the tests for equal to zero in criterion (1) and the definition of $\varepsilon$ in criterion (3). Past results have shown that 0.0001 can be used as the test for zero in criterion (1). A value of $\varepsilon$ equal to 0.5 is typically used for criterion (3). This value may allow for elliptical cross-sections in testing for tubular objects.

There are a number of approaches to evaluate the tangent vector $\vec{t}$ and normal vectors $\vec{n}_1 \ldots \vec{n}_{N-1}$ known to those skilled in the art. For example, thresholding can be used to determine the local, bright image elements on the tubular object of interest and the best fitting linear approximation of their positions may approximate the tangent direction. However, the on optional approach is to compute a Hessian at point x using scale σ. As used herein, for a real-valued, multivariate function f(x), where x is a vector representing independent variables, the Hessian may be defined as a matrix whose $(i,j)^{th}$ entry is $\partial^2 f / \partial x_i \partial x_j$. Following the work described in Eberly, D., "A Differential Approach to Anisotropic Diffusion," Geometry-Driven Diffusion in Computer Vision, Kluwer Academic Publishers, Dordrecht, N L, (1994), the N−1 most negative eigenvalued eigenvectors of the Hessian, evaluated at x, can be used to approximate the vectors $\vec{n}_1 \ldots \vec{n}_{N-1}$ normal to the ridge at x. The remaining eigenvector of the Hessian approximates the ridge's tangent direction. Therefore, using the Hessian, or approximations to the Hessian known to those skilled in the art such as described in the Eberly reference cited above, the eigenvalues and eigenvectors can provide information to describe vectors normal and tangent to the tubular object's central curve of intensity extrema, and evaluate the tubular extrema criteria corresponding to a maximum intensity value on a central curve of intensity extrema.

One for computing the tubular extrema criteria is to compute the Hessian H at point x using scale σ. Also, $v_i$ and $a_i$ are defined as the eigenvectors and associated eigenvalues of H where $a_i < a_{i+1}$. If x is on a 1-D ridge in N-D space, then $v_N$ approximates the ridge's tangent direction at x and $v_1$ to $v_{N-1}$ approximate the ridge's normal directions. For x to be classified as being on a 1-D in N-D ridge, the point is a ridge $a_{N-1} < 0$ and the point is a maximum in the ridge's approximate normal directions $\Sigma_{i=1 \ldots N-1}(v_i \cdot \nabla /)^2 0$. In a 3-D dataset, a ridge may also be determined by determining when the following three equations are true: $a_2/(a_1^2 + a_2^2 + a_3^2)^{1/2} \sim < -0.5$ (Eq. 1), $v_1 \cdot \nabla | 0$ (Eq. 2), and $v_2 \cdot \nabla | 0$ (Eq. 3). Eq. 1 states that most of the local curvature is captured by the two principal components of the Hessian (hence the inequality is less than −0.5) and that the curvature is negative, corresponding to a ridge rather than a valley. Eq. 2 and Eq. 3 state the point is an approximate maximum in the normal directions as defined by the gradient of the intensity matrix.

Using the eigenvectors of the Hessian to define the principle directions of an extremum makes this ridge definition a "maximum-curvature" ridge definition. Explicit tangent and normal directions can be calculated using third-order information. Such high-order information may be costly to generate, e.g., requiring fourth-order spline approximations to have first order continuity of tangent vectors. As a result, in practice, the approximations provided by the eigenvectors of the Hessian may be used. These approximations are known to those skilled in the art and are described in the Eberly reference cited above.

A number of possibilities exist for automatically identifying seed points. The first class of approaches involves searching the entire N-D image for seed points, and testing each image element using the tubular extrema criteria. For this embodiment, tight restrictions may be placed on the tubular extrema criteria for the initial point on each potential 1-D central track in order to reduce the extraction of ill-defined tubular objects. Nevertheless, most tubes in an image may be extracted since valid tubes may meet the tighter tubular extrema criteria at some point along their extent, if not at every point. The same tube is generally not extracted twice. The auto-extraction technique has proven useful in the extraction of vessels of the lung and in the processing of certain confocal microscopy images.

The efficiency of this embodiment depends most heavily on the number of search points that are considered. Various embodiments of this technique address this efficiency issue. One approach to reduce computation time limits the seed points searched to those points above an intensity threshold, or intensity window. Image elements exceeding this threshold produce candidate seed points which are then tested using the tubular extrema criteria to determine if they are proximal to a 1-D central track. This intensity threshold can be set manually by the user or can be determined by analyzing image statistics, such as, for example, performing a histogram analysis to estimate the mean and standard deviation of intensities associated with tubular and non-tubular objects and using those statistics to define thresholds that with high probability identify tubular object points. Generally, a threshold may to be established for each image processed. This constraint is also helpful if extraneous tubes are being extracted from within a particularly noisy image. Another embodiment for reducing the computation time of automatic seed point determination is to use a matched filter to determine candidate seed points. A kernel which approximates the tubular object of interest is convolved with the entire image. The result of this convolution produces peaks at locations where candidate seed points exist. These candidate seed points are tested using tubular extrema criteria to determine if they are proximal to a 1-D central track of a tubular object of interest.

Another embodiment of the invention limits automatic seed point determination to search spaces confined to the space just beyond the surface of each tubular object already extracted. The user first specifies a tubular object to be extracted using the manual approach described above. All seed points in the vicinity of the extracted tube will be automatically identified by searching the space confined to the tube. Subsequent processing steps will automatically extract all tubular objects that abut the initially extracted tubular object. Once again, stricter tubular extrema criteria are employed to test the candidate seed points to eliminate the extraction of ill-defined tubes. This automated extraction technique combined with a threshold constraint has proven useful for generating representations of vessel trees. Automated branch-point identification can also be used to limit where along a tubular object the search for connecting tubular objects is conducted. Automated branch-point identification may utilize a measure of branch probability, which can be a byproduct of the cross-sectional extent estimation process. At points at which the branch probability is high, a search around that tubular object for a seed point may be performed. As with the threshold-based potential seed point points, the collection of potential seed points produced by the search may be evaluated using the tubular extrema criteria defined above. As a result, many of the tubular objects that are missed by the first automated extraction initiation method may be captured by the second. Automated branch-point identification and cross-sectional extent estimation are described in more detail below.

Figure 5:
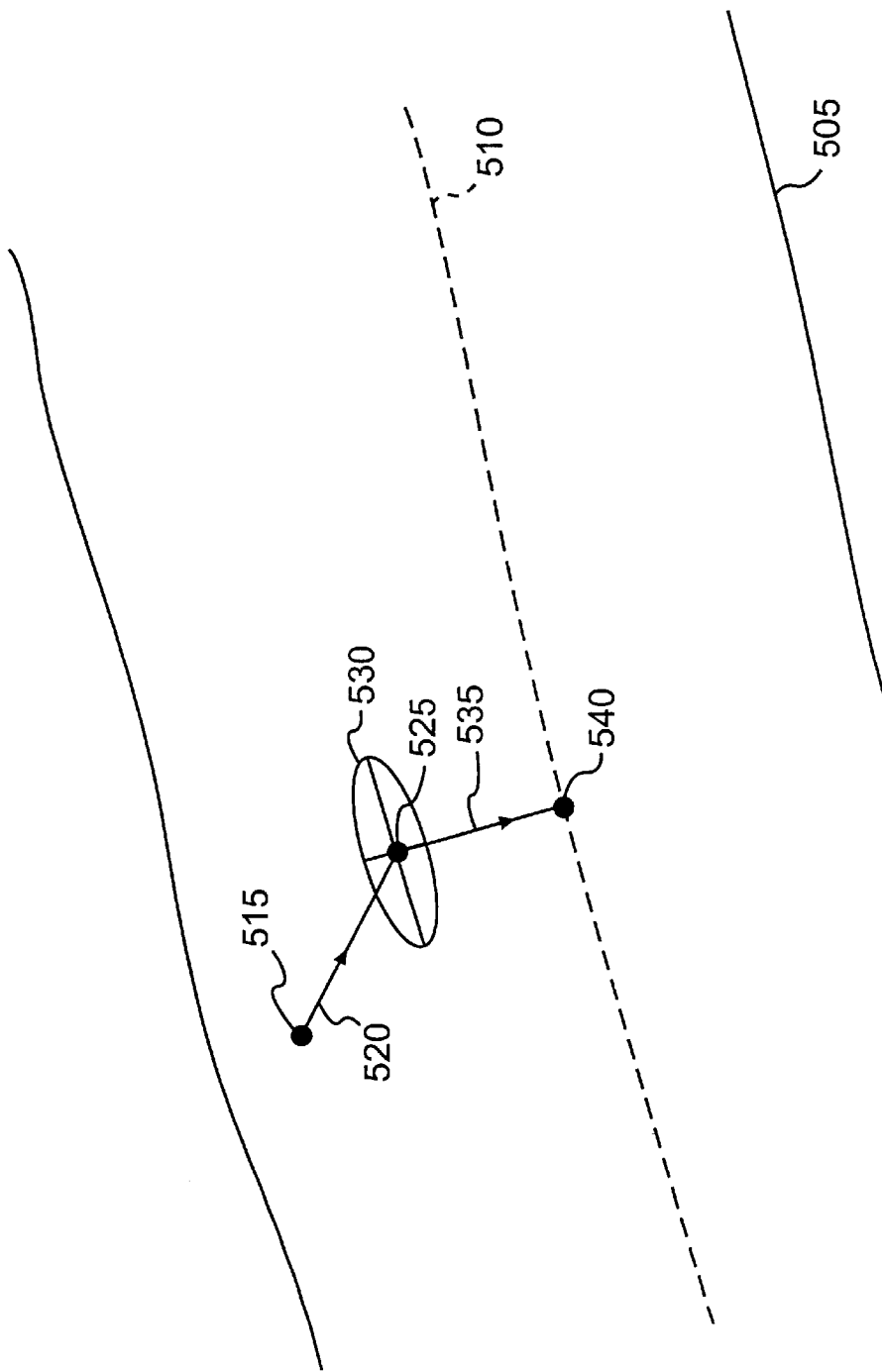
FIG. 5 is a diagram depicting the process of flowing from a seed point to an extremum point on a central curve of intensity extrema.

Further referring to FIG. 4, after seed points have been identified (step 420), a search for an extremum point on the central curve of intensity extrema is performed starting from the seed point (step 430). FIG. 5 illustrates an example of step 430 for a 2-D tubular object. FIG. 5 and the following explanation merely provide one example of a simple, initial overview of how step 430 may operate. Seed point 515 has been identified for 2-D tubular object 505, and the goal of step 430 is to "flow" from seed point 505 to a point of maximum intensity 540 on central curve of intensity extrema 510. From seed point 515, the method first proceeds using a line search in the direction of maximum intensity assent to point 525, which may not be the shortest path to central curve of intensity extrema 510 as shown. Vector 535, which is approximately normal to central curve of intensity extrema 510, is then computed by mathematical operator 530. As described above, mathematical operator 530 may be the Hessian. From point 525, a linear search for an intensity maximum is preformed. This search may be confined in the direction of normal vector 535. By confining the search in the direction of the normal vector, step 430 maximizes the probability of finding a maximum intensity value on central curve of intensity extrema 510. Once it has been determined that point 540 passes the tubular extrema criteria, it then becomes the initial point describing the 1-D central track (which as shown here closely approximates central curve of intensity extrema 510, and therefore is not shown). As described above, the 1-D central track may be a set of ordered points which represents tubular object 505.

Figure 6:
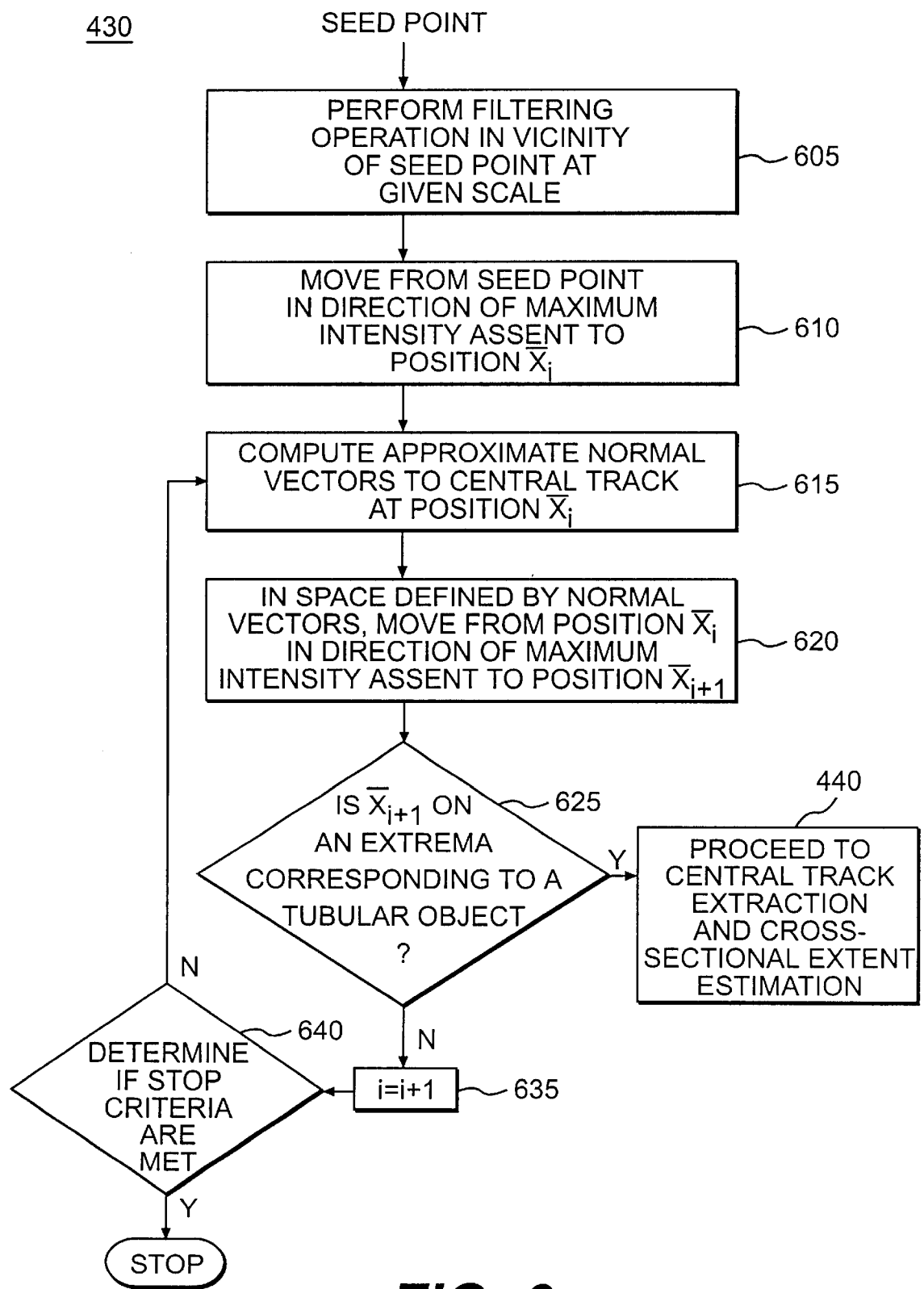
FIG. 6 is a flow chart showing an example of a method for determining a point of maximum intensity on a central curve of intensity extrema.

FIG. 6 shows a flowchart detailing the sub-steps of step 430 which are generalized for N-D images. Once a seed point has been provided, the image elements are typically convolved with a filter to enhance or produce a central curve of intensity extrema along the tubular object of interest (step 605). The extent of the filtering performed in step 605 is local to the vicinity where extrema points will be searched. If preprocessing step 410 performed this operation earlier, or if the central curve of intensity extrema already exists along the tube, step 605 optionally is not be performed. The scale at which this is performed may be the scale which was input by the user when the seed point was specified, or the scale may have been determined through automatic means, as described above. The gradient of the image at the seed point is then computed to provide the direction of maximum intensity assent, and a step is taken in this direction to a point at position $x_i$ (step 610). This step is generally set to $\frac{1}{5}^{th}$ of the image element size so as to produce accurate results, but may be set larger if less accurate or faster representations are needed. Vectors approximately normal to the central curve of intensity extrema are computed at position $x_i$ (step 615). The normal vectors are preferably derived from the eigenvectors corresponding to the N−1 most negative eigenvalues of the Hessian computed at position $x_i$, as was described above. In the (N−1)-D space defined by the normal vectors, another gradient is computed at position $x_i$, and a step in the direction of greatest intensity assent is taken to position $x_{i+1}$ (step 620). Note that for the 2-D tubular object of FIG. 5, this normal space was defined by line 535. For a 3-D tubular object, the space defined by the normal vectors would be a plane. A test using the tubular extrema criteria is performed on the point at position $x_{i+1}$ (step 625). If the point at position $x_{i+1}$, corresponds to an extrema point on the central curve of intensity extrema, position $x_{i+1}$ becomes the first point representing the 1-D central track of the tubular object, and processing proceeds to central track extraction (step 420). If the point at position $x_{i+1}$, fails the test at step 625, a counter is incremented (step 635) and steps 615, 620, and 625 may repeat where $x_{i+1}$ becomes the new starting position. A test is performed (step 640) within this loop to determine if any stop criteria are met. One optional stop criteria is performing the iteration N−2 times. If no extremum point corresponding to the central curve of intensity extrema is found within N−2 times, method 430 will stop, or begin the process again with a new seed point being specified.

Figure 7:
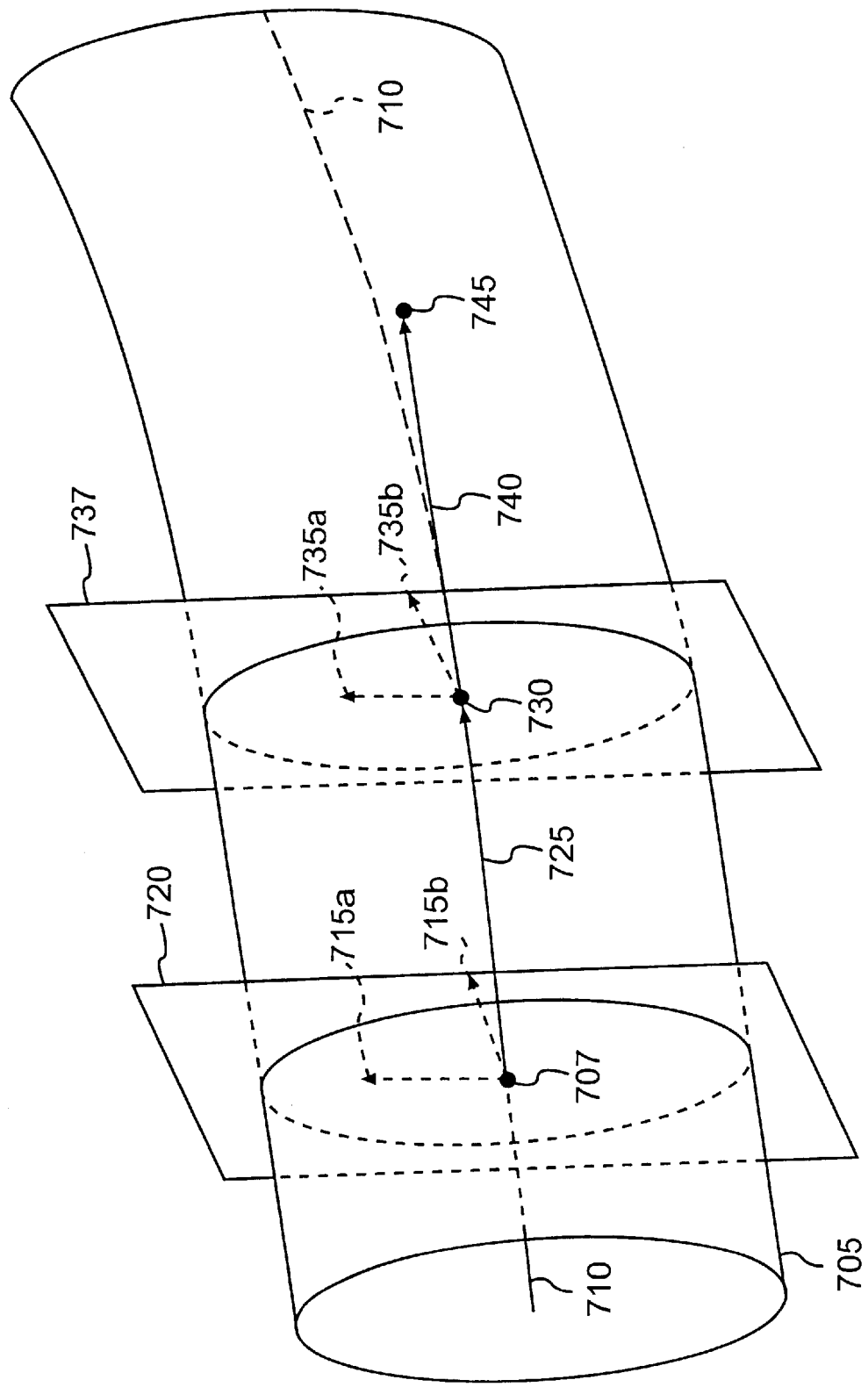
FIG. 7 is a diagram showing the process of extracting a 1-D central track along a tubular object.

Referring again to FIG. 4, once an initial extremum on the central curve of intensity extrema has been found on a tubular object of interest (step 430), central track extraction and width estimation can begin (step 440). FIG. 7 illustrates an example of the 1-D central track extraction of step 440 for 3-D tubular object 705. FIG. 7 and the following explanation provides one example of a simple, initial overview of how 1-D central track extraction operates. The method starts with initial extremum point 707 on central curve of intensity extrema 710, wherein the position of point 707 denotes the first point in the sequence of points defining the 1-D central track. Normal vectors 715a and 715b may be computed and define a plane 720 which is approximately orthogonal to central curve of intensity extrema 710 and 3-D tubular object 705. Tangent vector 725, which is approximately tangent to central curve of intensity extrema 710, is also computed. Normal vectors 715a, 715b and tangent vector 725 may be computed using the Hessian as described above. In order to determine the next position describing the central track, plane 720 is shifted along tangent vector 725 to new position 730. Preferably, central curve of intensity extrema 710 is interpolated so the shift amount, and the 1-D central track spacing, may be on the order of a fraction of a voxel. New normal vectors 735a, 735b and new tangent vector 740 are calculated at position 730 in the same manner as before. The point at position 730 is tested using the tubular extremum criteria described above to determine if it corresponds to a maximum intensity point on central curve of intensity extrema 710. If point 730 is off central curve of intensity extrema 710, a search to find the maximum value is performed in plane 720, defined by normal vectors 715a and 715b, in order to "get back on" central curve of intensity extrema 710. The search is confined to plane 720 in order to maximize the probability of finding an extremum corresponding to central curve of intensity extrema 710. Assuming point 730 passed the tubular extremum criteria, the position at point 730 is recorded as the next point on the 1-D track and new normal plane 737 is shifted in the direction of new tangent vector 740 to point 745. This "shift-maximize" process continues until any one of a number of termination criteria are met. Note point 745 is no longer on central curve of intensity extrema 710, and as such will not meet the tubular extrema criteria. This can occur if the step size is too large relative to the curvature of tubular object 705. This "shift-maximize" process continues in the direction of the tangent vector until a termination criteria is met. Afterwards, the process begins again at initial extremum point 707 and continues in the negative direction of tangent vector 725 so that the 1-D central track for the entire tubular object is extracted.

Figure 8:
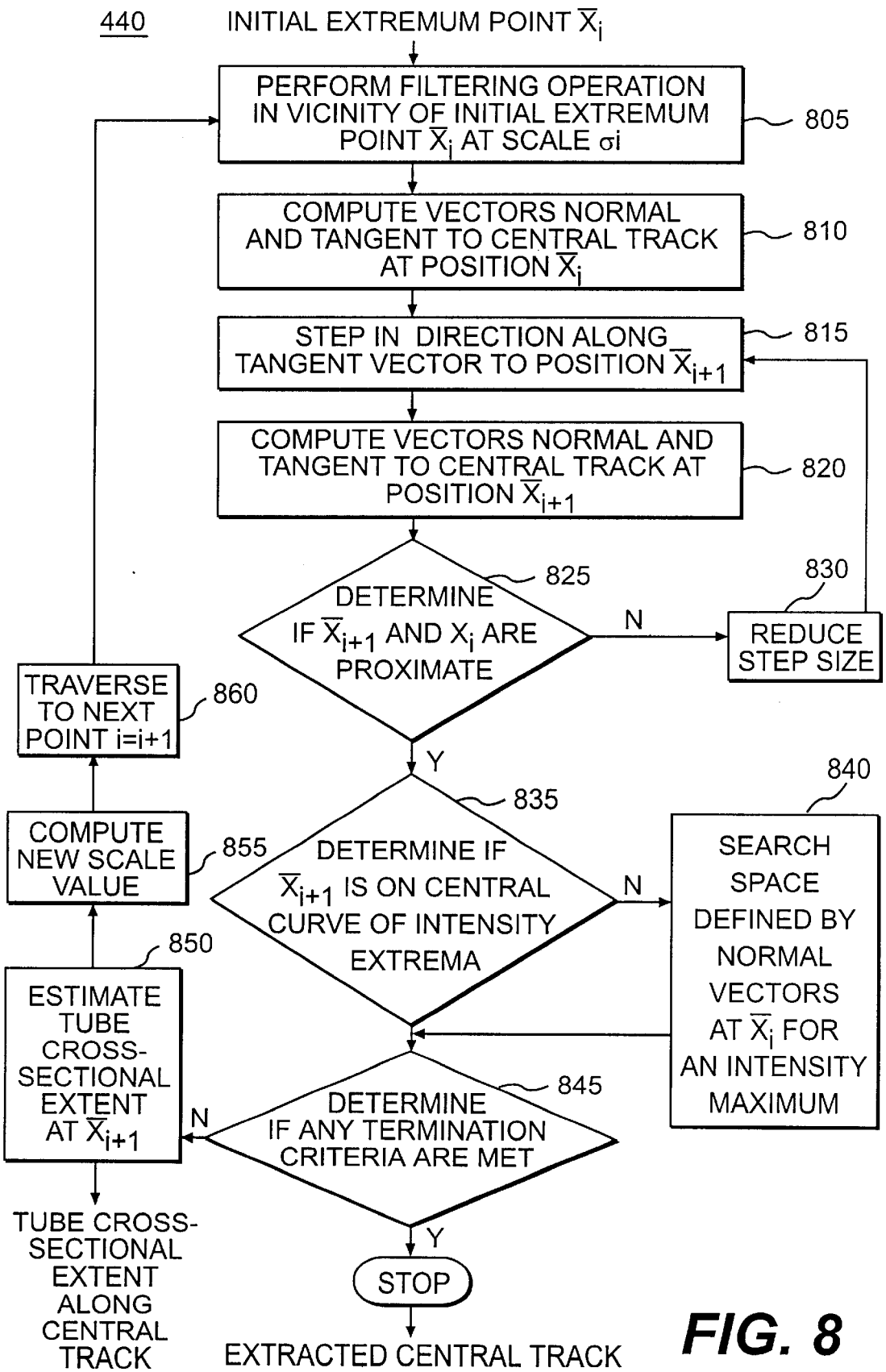
FIG. 8 is a detailed flow chart showing an example of a method for extracting a 1-D central track along a tubular object.

FIG. 8 shows a flowchart detailing the sub-steps of step 440 which are generalized for N-D images. Once an initial extremum point $x_i$ has been provided (which also serves as the initial point representing the 1-D central track), the image elements are typically convolved with a filter to enhance or produce a central curve of intensity extrema along the tubular object of interest (step 805). The extent of the filtering performed in step 805 is local to the vicinity where extrema points will be searched. If preprocessing step 410 performed this operation earlier, or if the central curve of intensity extrema already exists along the tube, step 805 optionally is not performed. The scale at which the convolution is performed may be adaptive and can be controlled by an estimated cross-sectional extent of the tubular object calculated at a prior point along the 1-D central track. The use of multiple scales for 1-D central track extraction may optimize method 440 for tubes of varying cross-sectional extents, and may allow branching trees of tubular objects to be automatically processed with little or no user intervention. The operation of the adaptive scale technique, and how cross-sectional extents are computed, is described in more detail below. Additionally, by taking into account the extraction of 1-D central tracks within tubular objects, and by filtering the image as the 1-D central track is extracted, anisotropic filtering can also be used to optimize the appearance of a central track.

After filtering is performed, the vectors approximately normal, $(\vec{n}_1 \ldots \vec{n}_{N-1})_i$, and tangent, $\vec{t}_i$, to the central curve of intensity extrema at position $x_i$ are computed (step 810). As previously described, this computation preferably utilizes the eigenvalues and eigenvectors of the Hessian computed at point $x_i$. A step in the direction of the tangent vector may be then taken to a point at position $x_{i+1}$ (step 815). Typically the magnitude of the step size may be smaller than the image element spacing along the central curve of intensity extrema. Therefore, the central curve of intensity extrema may be interpolated to attain spacings along the 1-D central track which are a fraction of the image element spacing. These spacings can range from the inner scale to an order of magnitude times the image element spacing, and typically are 0.2 times the image element spacing, but can be adjusted during the traversal method based upon a number of conditions, such as, for example, the estimated cross-sectional extent of the tubular object. This spacing, however, may depend on the particular imaging application. Preferably, an approximating cubic spline is fitted to the image data to generate sub-image element values and any necessary derivative information; however, other interpolation methods known to those skilled in the art may be used.

Further referring to FIG. 8, the vectors approximately normal, $(\vec{n}_1 \ldots \vec{n}_{N-1})_{i+1}$, and tangent, $\vec{t}_{i+1}$, to the central curve of intensity extrema at point $x_{i+1}$ may be computed (step 830). As previously described, this computation preferably utilizes the eigenvalues and eigenvectors of the Hessian computed at point $x_{i+1}$. Tests may then be performed to ensure positions $x_i$ and $x_{i+1}$ are proximal in order to ensure that the resulting 1-D central track is smooth (step 825). For example, one test may see if $\vec{t}_i$ and $\vec{t}_{i+1}$ have the same sign. If these signs differ, the sign on $\vec{t}_{i+1}$ could be flipped to ensure 1-D central ridge extraction continues in the same direction. Another test could threshold the dot product of the tangent vectors to ensure they are not too far off in relative angle and/or magnitude, i.e., $\vec{t}_{i+1} \cdot \vec{t}_i > \alpha$. In practice, the threshold $\alpha$ could be set at $0.7\pi$. Another test could be to threshold the Euclidean distance between the two points. That is, $\sqrt{(x_{i+1}-x_i)\cdot(x_{i+1}-x_i)} < D$ should be satisfied to pass the proximity test. In practice, the value of D may typically set to 1. Any one of these example proximity tests may be used by themselves or in any combination. Other proximity tests known to those skilled in the art could also be used. If a proximity test in step 825 fails, the step size is reduced (step 830), wherein a typical reduction reduces the step size by a factor of 90%, and steps 815 and 820 are repeated until a proximity test in step 825 passes.

Referring again to FIG. 8, a test is performed to determine if the location of point $x_{i+1}$ is on the central curve of intensity extrema (step 835). This test utilizes the tubular extrema criteria described above. If the point $x_{i+1}$ does not pass these criteria, it "fell off" the central curve of intensity extrema, and the space defined by the normal vectors $(\vec{n}_1 \ldots \vec{n}_{N-1})_i$ is shifted to point $x_{i+1}$ and then searched for a local maximum intensity on the tubular object (step 840). This is done in order to "get back on" the central curve of intensity extrema. Numerical maximization techniques known to those skilled in the art may be used in step 840, such as, for example, a conjugate gradient method, golden-mean search, or gradient ascent methods, etc.

Further referring to FIG. 8, a test to determine when to terminate method 440 is performed utilizing at least one termination criteria, which is described in detail below. If none of the termination criteria is met, then a cross-sectional extent of the tubular object may be estimated at position $x_{i+1}$ (step 850), a new scale value may be computed using the cross-sectional extent (step 855), and the shift-maximize procedure may be repeated for the next point along the tubular object (steps 860, 805–845).

If any termination criteria in step 845 is met, the shift-maximize process terminates and the extracted points along the 1-D central track are saved as an ordered set of points along with the cross-sectional extents associated with each point along the 1-D central track. Method 440 then repeats the entire process starting at the initial 1-D central point where the above extraction started and proceeds in the negative direction of the tangent vector, $-\vec{t}_i$, in order to extract the representation of the entire extent along the tube.

In step 855, the scale value may be computed by setting it equal to some fraction of the cross-sectional extent. The value of this fraction may depend on the imaging application. For medical imaging applications, the value of this fraction may, for example, be typically 1 if the tubular objects of interest are substantially isolated from surrounding objects. If this is not the case, a fraction of 0.5 may be used.

The termination criteria include encountering another tube (entering the image element of a previously extracted central track); experiencing a rapid change in spatial location; experiencing a rapid change in tangent direction; and failing to find an extremum point on the central curve of intensity extrema. The latter three termination criteria generally occur when a neighboring object interrupts the search for a local maximum the space defined by normal vectors $(\vec{n}_1 \ldots \vec{n}_{N-1})_i$. Often, in these cases, the correct 1-D central track can be found by re-maximizing in the same space defined by $(\vec{n}_1 \ldots \vec{n}_{N-1})_i$ using a slightly smaller filtering scale. This recovery technique is preferably automated by identifying the termination points and then stepping beyond them using the smaller scale. Typically the smaller scale is 90% of the initial filtering scale.

Sequentially computing a position on the 1-D central track and then computing a cross-sectional extent associated with that position, for each position extracted along the extent of the tubular object, is one example of a method of generating the representation of the tubular object. As shown in FIG. 8, a cross-sectional extent estimate is made for each point extracted along the tubular object. One optional embodiment of the invention could compute one cross-sectional extent for every M points extracted along the 1-D central track, where M is an integer greater than one. This approach could be used to further improve the efficiency of the extraction process.

Effectiveness of the traversal process can be enhanced by extending the notion of a central curve of intensity extrema to include connector curves. Connector curves exist as a continuum of points, between two valid central curves of intensity extrema, that deviate from the traditional tubular extremum definition. Consider one particular type of connector curve, the "M-connector."

A point is on an M-Connector if the point meets every ridge criterion, but has two further properties: 1) the smallest eigenvalue is negative, $a_N$~<0, which implies the point is maximal in every direction, and 2) the tangent direction is best approximated by $v_i$ where i N, which implies the eigenvectors have swapped. To continue traversal of the central curve of intensity extrema, the eigenvector which best approximates the tangent direction is used to shift the space defined by the normal vectors and the remaining eigenvectors are used to define the normal space.

Figure 9A:
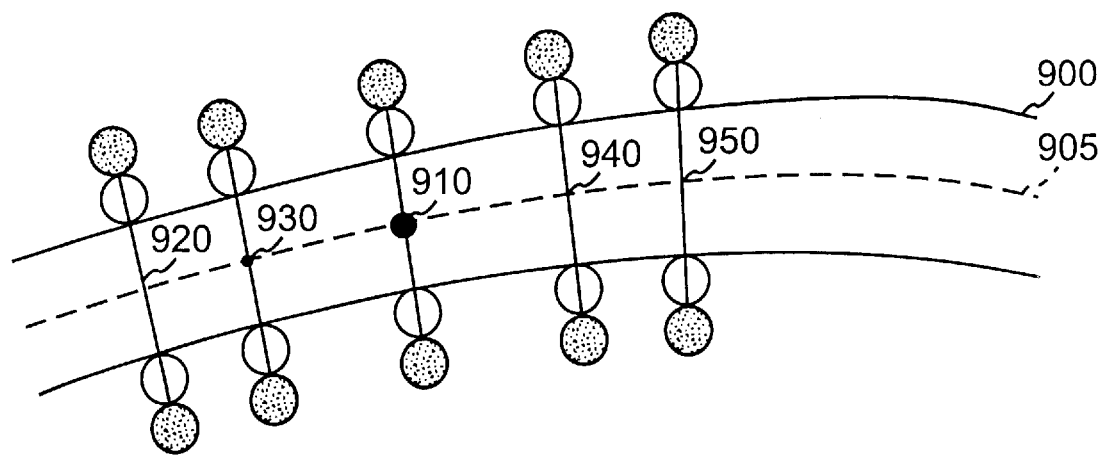
FIG. 9A is a 2-D slice along the 1-D central track of a 3-D tube showing the slice's intersections with the kernels of a medialness filter.
Figure 9B:
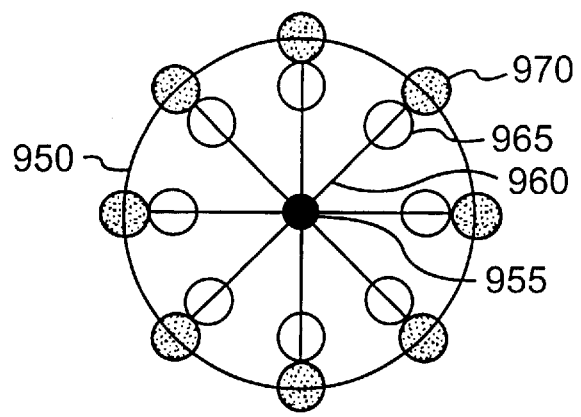
FIG. 9B is a 2-D slice perpendicular to the 1-D central track of a 3-D tube showing the slice's intersections with kernels of the medialness filter.

Cross-sectional extent estimation may be part of the extraction process and may be used to fully represent a tubular object. FIGS. 9A and 9B show an example of estimating a tubular object's cross-sectional extent in terms of a radius r. This is accomplished by finding a local maximum of a medialness function M(●) at a position $x_i$:

$$r_i = \mathrm{argmax}_\rho(M(x_i, \vec{t}_i, \rho)).$$

FIG. 9B shows a 2-D slice 950 perpendicular to a 3-D tubular object and the medialness function. One possible example of a medialness function uses a convolutional kernel formed by a ring of boundary operators (exemplified by 965, 970), with center 955 at $x_i$, substantially orthogonal to a tangent vector $\vec{t}_i$ (not shown), at distance ρ 965 from $x_i$. The boundary operators (exemplified by 965, 970) may be a plurality of pairs of spherical kernels of size 0.25 ρ aligned radially about center 955, where the inner spheres 965 can be at a distance of 0.75 ρ and outer spheres 970 can be at a distance of 1.25 ρ. Inner spheres 965 may have filter values which are opposite in sign to outer spheres 970. This is a variant of a medialness kernel described in Morse, B. S., et al., "Robust Object Representation Through Object-Relevant Use of Scale," Medical imaging '94: Image Processing, vol. 2167, pages 104–115, SPIE (1994). In this example, the center 955 remains fixed at $x_i$, and distance ρ 965 is varied while the boundary operators are convolved with the image. The value of ρ which maximizes the convolution of the boundary operators with the image is the estimate the cross-sectional extent of the tubular object.

FIG. 9A illustrates a 2-D slice along a section of 3-D tube 900 showing the slice's intersection with a plurality of medialness functions. In order to obtain an more accurate estimate of the cross-sectional extent at point 910, the medialness function's response is measured at points 910–950 along 1-D central track 905. A weighted sum of these responses is performed to estimate the cross-sectional extent at point 910. The weight which is used on each medialness function adjacent to the point 910 is related to the distance of centers 920–950 from point 910. The spacing between points 920–950 is variable and is typically chosen to be equal to the image element spacing. This multi-kernel approach to width estimation uses the spatial consistency of tubular objects. This approach covers a large extent of the tubular object, thereby providing additional insensitivity to image noise; and fits the effective medialness function to the spatial curvature of the 1-D central track, thereby reducing assumptions about the along-track shape of the tube. As a result, the overall medialness measure is less sensitive to boundary irregularities (physically based and resulting from imaging system acquisition artifacts) and neighboring structures. Additionally, it can be used to automatically flag possible branch points as described below.

Figure 10A:
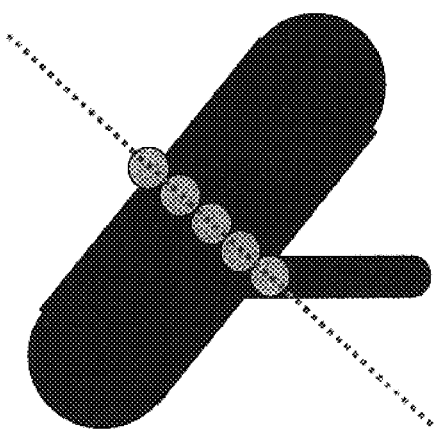
FIG. 10A is a diagram depicting the medialness function detecting a branch point from a top view.
Figure 10B:
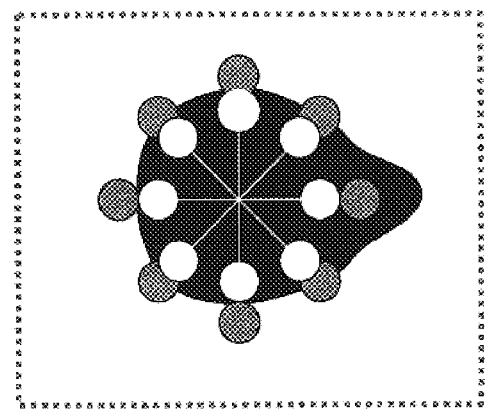
FIG. 10B is a diagram depicting the medialness function detecting a branch point from a cross-sectional view.

Branch points are locations where tubular objects which can be approximated by T, Y, or X shaped junctions. Automated branch-point identification can be used to limit where along a tube the search for connecting tubes is conducted. FIGS. 10A and 10B show how the medialness function can be used to detect branch points. As described above, given a central track along a 3-D tubular object, radial measurements can be made to estimate the cross-sectional extent of the tubular object. At branch points, one or more of the radial measurements will be anomalous. That is, if every kernel except one produces a strong response when convolved with the image, it is probable that a vessel branch exists under the questionable kernel. FIG. 10A is a "top-down" view of a tubular object. The dashed line indicates a plane cutting through the object at a branch point. FIG. 10B shows how a series of radial measures can be used to estimate the radius of the object—inconsistent radius estimates could indicate the possible existence of branch points. These branch points can be used as potential seed points in order to extract branching trees of tubular objects as described above.

Figure 11:
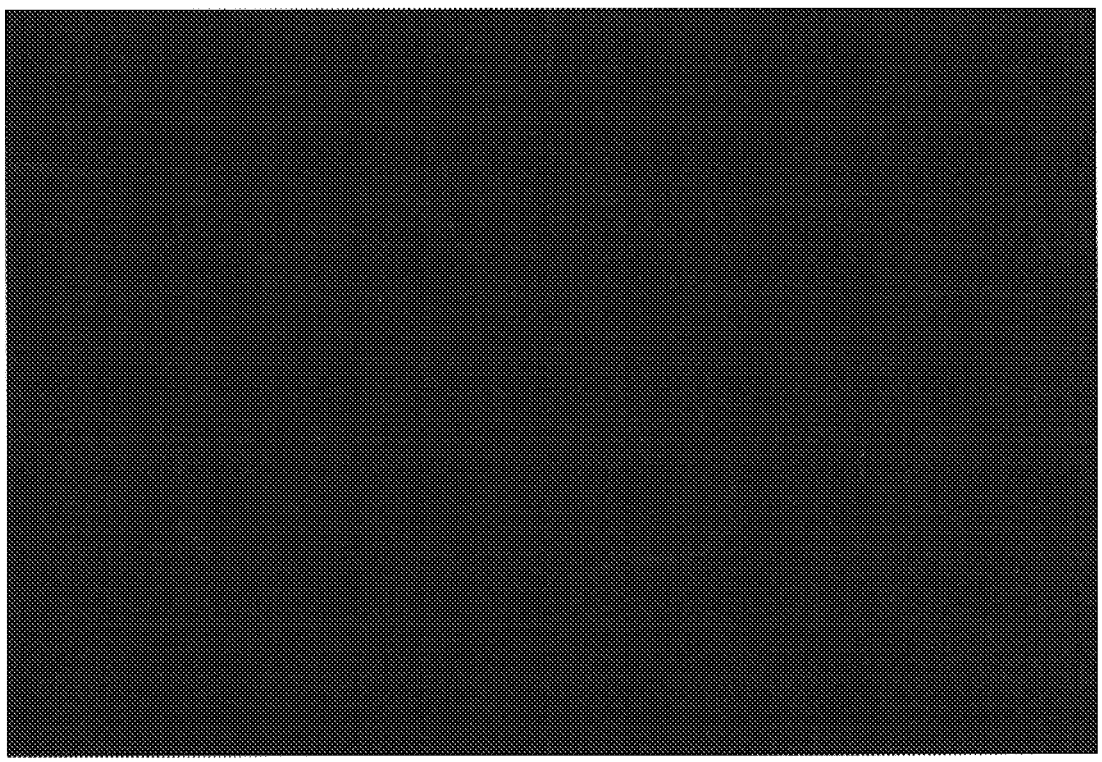
FIG. 11 shows the 1-D central track extractions representing two tubular objects taken from a Magnetic Resonance Angiogram (MRA) of a human brain.

FIG. 11 illustrates the effectiveness of the traversal method. Two point-and-click operations within a single slice of an MRA resulted in the generation of these two 3-D representations of tubular objects from an MRA. Multiple branch points were passed and a large range of tubular object cross-sectional extents (0.3 mm to 0.5 mm) and contrast levels were traversed using a single filtering scale (0.75 mm).

Figure 12:
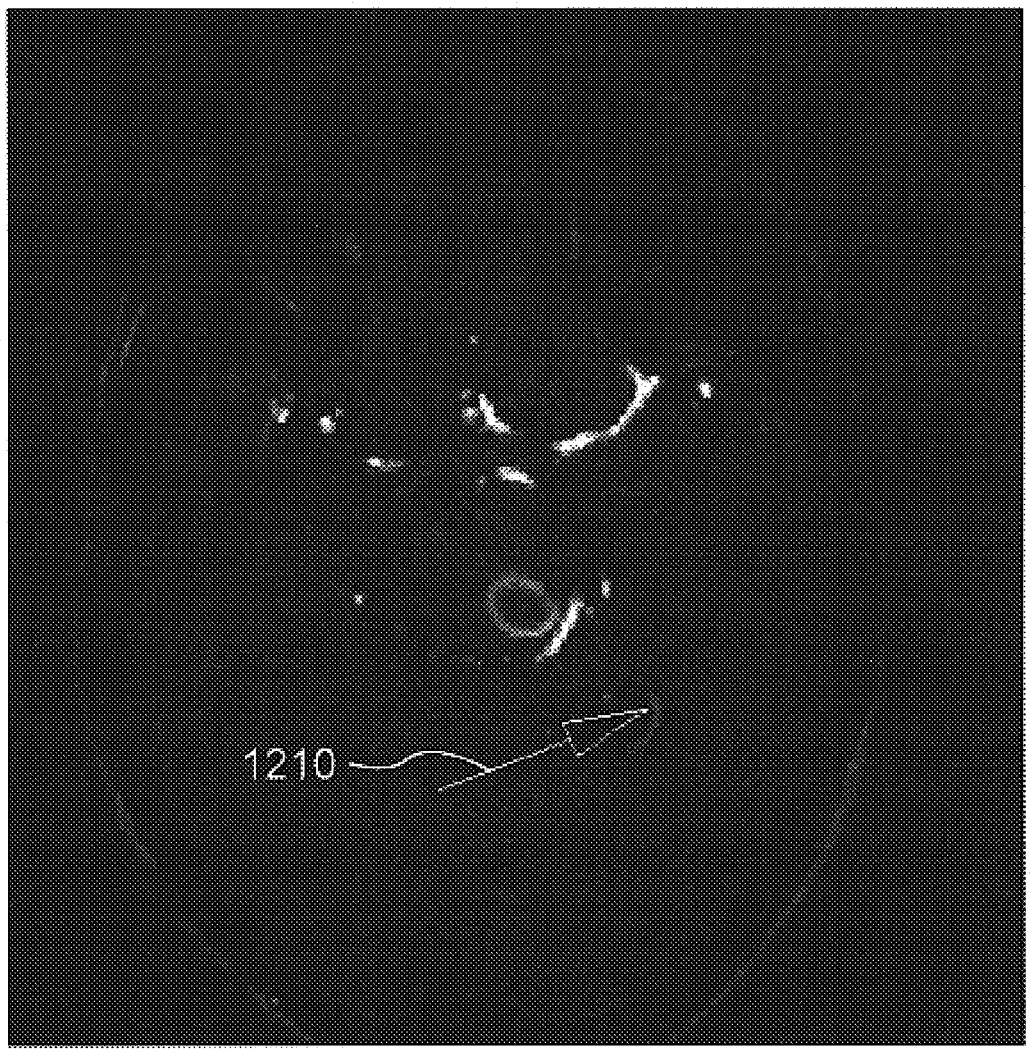
FIG. 12 shows one slice of an MRA image illustrating a vessel of interest used in Monte Carlo Analyses.
Figure 13:
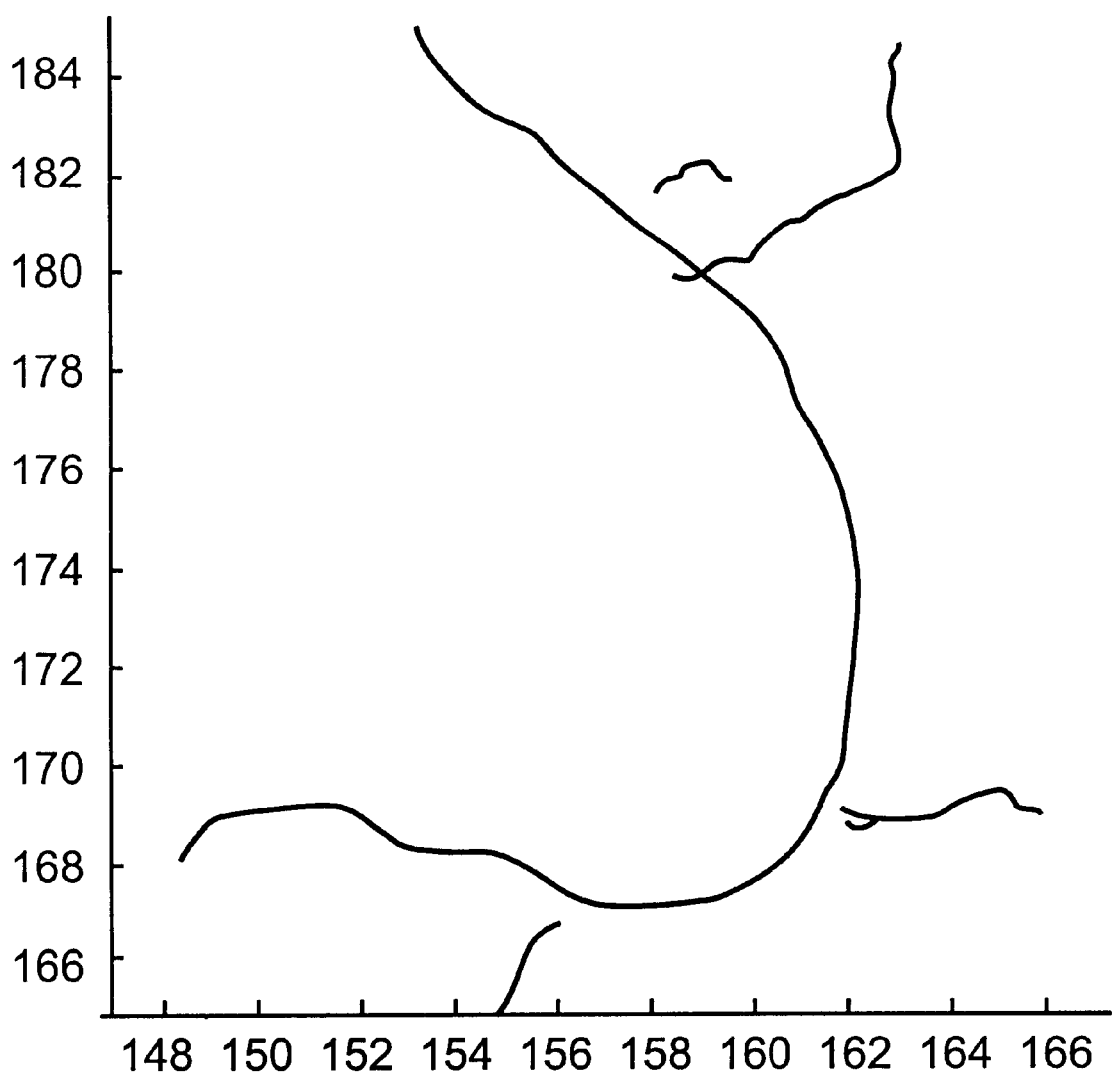
FIG. 13 is a graph demonstrating the stability of the extractions of the 1-D central track of the vessel shown in FIG. 12.

A Monte Carlo experiment was employed to evaluate the consistency of an embodiment of the invention's extractions with respect to the location of the seed point and the filtering scale values. FIG. 12 shows an MRA slice where small and tortuous vessel 1210 was designated for repeated extractions. A "baseline" representation of this vessel was extracted. To simplify the comparison of multiple extractions, this and subsequent extractions were limited to a subset of image space. The subspace extends along the vessel for a large extent, i.e., ~20 voxels=~20 mm, and in all three dimensions well beyond the vessel's edges. Three different initial cross-sectional extent estimates (0.5, 1.0, and 2.0 mm) and 100 seed points distributed uniformly along the vessel segment and extending uniformly in three dimensions about the vessel were randomly generated. Three hundred tubular objects associated with those seed points were extracted. Plotting X-vs-Y (ignoring Z although it was also estimated) for the points on the 1-D central tracks from all of those extractions produced the results shown in FIG. 13. FIG. 13 shows three hundred overlapping 1-D central tracks extracted using different scales and different stimulation points, for an extremely small vessel in an MRA. Occasionally neighboring vessels were extracted as indicated by the branches from the vessel-of-interest, but their extraction is not a failing of the technique—they are accurate extractions given certain stimulation points. In this example, the maximum difference between the two closest points from any two different extractions of the vessel-of-interest was always much less than ⅒th of a voxel. Optionally consistent 1-D central track representations produced which may be generally insensitive to seed point location (and thus user-interaction if manual seed-point designation is considered) and parameter settings (scale of image measurement).

Symbolic Manipulation

Further referring to FIG. 4, once representations of tubular objects have been produced, subsequent processing may be performed to derive useful information regarding the image (step 450). As an enabling, computer-hardware-independent, data-source-independent technology, the invention may be applied to a wide range of computer-based tasks. Optionally this broad applicability may have significant utility since the disclosed method may provide an accurate and consistent representation of tubular objects that may enable new applications and that may improve the accuracy and consistency of existing applications. Additionally, the basis of this representation, the 1-D central track may, provide a unit of tube representation that enables important symbolic manipulation of a collection of tubes.

The representation of tubular objects provides for symbolic representations and manipulations. With symbolic representations, the 1-D central track and cross-sectional extents are represented by data structures. Utilizing these data structures, various operations, such as, for example, numerical, graphical and set operations, may be performed. Numerical operations could quantitatively describe physical characteristics of the tubular object, such as, for example, determining the surface area or volumetric capacity of a tubular object of interest. Set operations may allow logical groupings among sets of tubular objects, such as unions, intersections, etc. Graph operations permit relational descriptions among tubular objects whereby connectedness of tubular objects can be defined. One definition of connectedness is analogous to tree-like structures. Utilizing these various operations, by themselves or in combination with each other, sub-trees can be viewed in isolation or removed from view, flow within tubes can be estimated, flow cycles can be detected and quantified, and numerous other analytical operations can be performed. Such manipulations differ from traditional representation techniques, such as image element segmentation, that utilize image elements alone to represent and analyze objects found in images. These image element based techniques do not form descriptions of each tubular object or the connectedness of the tubular objects. As a result, image element based tube representation methods are limited to providing image element based visualizations and measurements. For many applications, symbolic tubular object based visualization and analysis may have greater utility.

Figure 14:
FIG. 14 is an image showing extracted representations of vessels having been joined and color coded to aid in visualizing vessel groups of anatomical interest.

For example, FIG. 14 shows an image of the 1-D central track representations extracted from an MRA. In this image the representations have been joined using graph operations and color coded, for example, to illustrate select vessels and sub-trees of anatomical interest. Such visualizations may be useful for teaching vascular anatomy, visualizing the extent of vasculature that will be affected by embolizing (blocking) a tube, identifying the arteries and veins that lead to a tumor, or in another application, identifying what parts of a computer chip would be affected by a break in a circuit.

Figure 15:
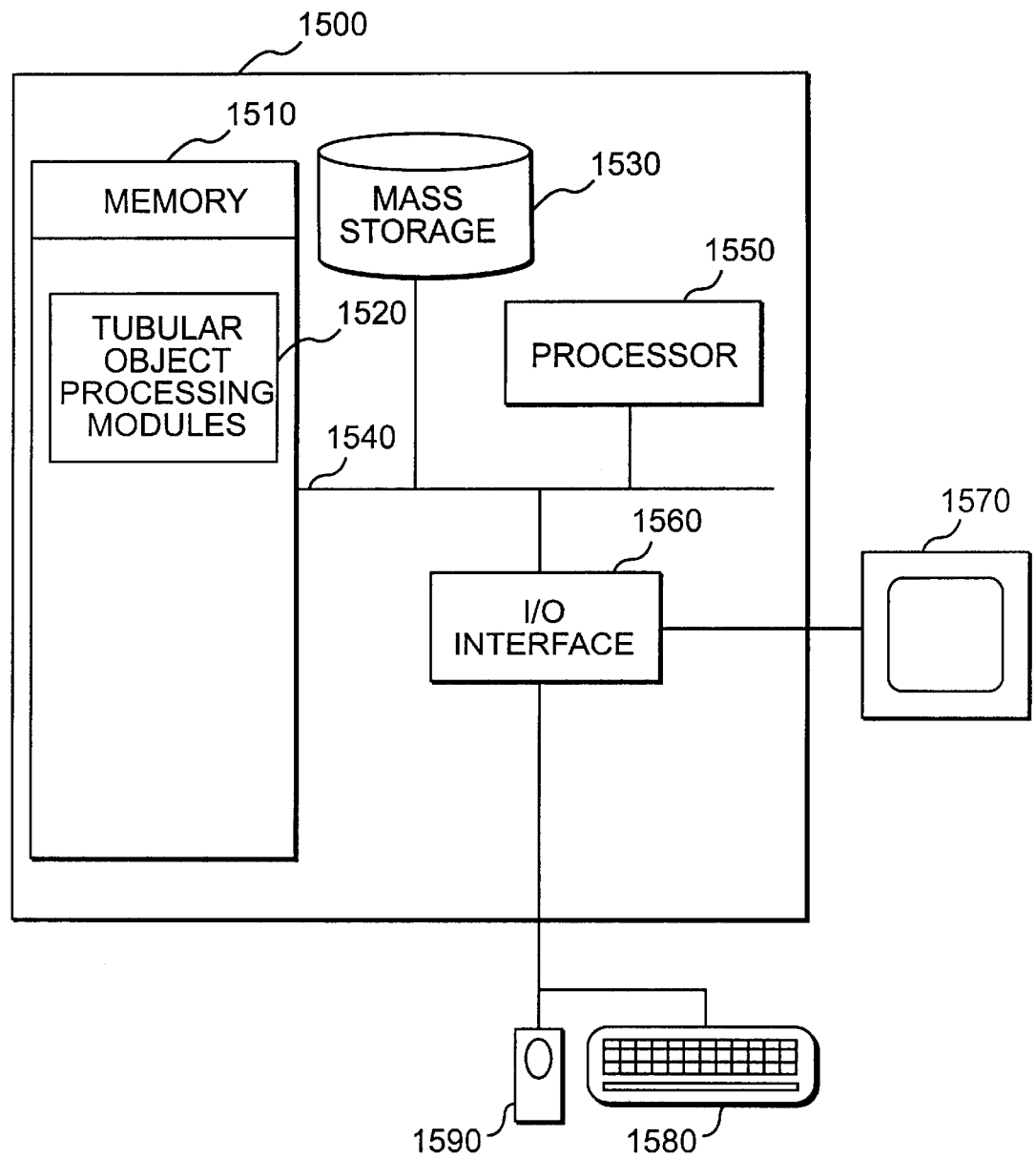
FIG. 15 shows an example of a system for processing tubular objects.

Referring to FIG. 15, an apparatus 1500 according to an embodiment of the present invention for processing tubular objects is shown. Tubular object processing module 1520, which contains instructions, is used to implement various steps of a method, such as the tubular processing method according to the present invention. The processing module 1520 may be generally located, in whole or in part, in a memory unit 1510. Processing module 1520 may also be stored in a mass storage device 1530. For example, instructions to execute the method of the present invention are carried out through the use of a processing unit 1550. Method steps implemented by processor 1550 may be communicated as electrical signals along bus a 1540 to an I/O interface 1560, where processing results may be displayed on a monitor 1570.

A graphical user interface module (not shown) may operate in conjunction with a display screen (not shown) of display monitor 1570. The graphical user interface may be implemented as part of the processing system 1500 to receive input data and commands from a conventional keyboard 1580 and mouse 1590 through I/O interface 1560 and display results on display monitor 1570. For simplicity of the drawings and explanation, many components of a conventional computer system have not been illustrated such as address buffers, memory buffers, and other standard control circuits because these elements are well known in the art and a detailed description thereof is not necessary for understanding either the embodiment shown in FIG. 15 or the present invention.

Pre-acquired image data can be fed directly into processing system 1500 through a network interface (not shown) and stored locally on mass storage device 1530 and/or in memory 1510. Furthermore, image data may also be supplied over a network, through a portable mass storage medium such as a removable hard disk, optical disks, tape drives, or any other type of data transfer and/or storage devices which are known in the art.

One skilled in the art will recognize that a parallel computer platform having multiple processors is also a suitable hardware platform for use with an apparatus according to the present invention. Such a configuration may include, but not be limited to, parallel machines and workstations with multiple processors. Processing system 1500 can be a single computer, or several computers can be connected through a communications network to create a logical processing system with the tubular object processing modules 1520 and processor unit 1550 distributed across the computers. The functions performed by processing system 1500 can also be executed by hardware and/or software associated with medical devices such as, for example, a surgical navigation device. Moreover, the computational operations described herein can be performed by a general purpose computer, or other computational devices in a stand-alone configuration or with the operations distributed among several devices in a distributed network, including, but not limited to, networks linked by the Internet.

EXAMPLE APPLICATIONS

In examples of a method according to the present invention, the method may (1) rapidly form (2) stable, (3) symbolic representations by (4) exploiting the geometric properties of tubes in a manner that ensures that (5) it operates independent of the data source (i.e., the imaging modality). Regarding the geometry of tubes, when tubes are defined via contrast, their geometry provides a stable track of central intensity extrema for a range of scales related to their widths. The method optionally forms a continuous representation of that central track. Stability over a large range of scales may provide a central track of a tube, and therefore a representation of that track that may be relatively insensitive to background, boundary, and object noise (i.e., the imaging modality). Representations may be symbolic so as to reduce an image containing multiple tubes to a set of curves, each representing a unique tube segment, that as units can be manipulated via set, graph, symbolic, and numeric operations.

As an enabling, computer-hardware-independent, data-source-independent technology, some examples of a method according to the invention may be applied to a wide range of computer-based tasks. This broad applicability may have significant utility, since at least some of the examples of the method may provide an accurate and consistent representation of tubes that enables new applications and that improves the accuracy and consistency of existing applications.

Vascular Tree Descriptions and Vessel Noise Elimination

Using representations of tubular objects may make it possible to provide information about objects found in images and to describe relationships between these objects. Such information can be highly valuable to a user in interpreting and extracting information from complex images.

While the embodiment described below relates to medical images containing vessels, it should be understood that at least some aspects of this example could be used in to other medical contexts, for example, in determining relationships among certain bone structures. The embodiment may also be generalized to other applications existing outside the medical context.

As used herein, the term "vessel" indicates a 3D, unbranched vascular segment. A vessel's "proximal" end is closest to the heart and the opposite end is "distal". Arterial flow is directed from proximal to distal. Venous flow is directed from distal to proximal. The term "parent" refers to a more proximal and usually larger vessel. The term "child" refers to a more distal connected branch. The direction of blood flow is from parent to child in the arterial system and from child to parent in the venous system. Occlusion of a parent may affect the flow to its children.

When visualizing blood vessels, for example, it may be desired both for surgical planning purposes and for certain medical procedures, for example, one in where a catheter is guided through a vascular network, to know which vessels are connected to each other. If one is treating a tumor, for example, one may want to cut off blood supply to that tumor. Since a "child" artery receives blood from its "parent" artery, blocking the parent can deprive the child of blood. If a child vessel passes through a tumor to supply blood to a normal brain, the patient may suffer a stroke if the parent vessel is occluded. Similarly, during catheter procedures it is may be desired to know which vessels are connected to each other as the catheter cannot jump from inside one vessel to a disconnected vessel. Knowledge of vessel connections and the direction of blood flow may enhance a variety of different surgical and medical treatments.

One possible embodiment of the present invention is directed to linking vessels represented by tubular objects together to define vascular parent-child relationships and the direction of blood flow within these vessels. As used herein, this process is referred to as a creation of "vascular trees". One example of the invention is performed after vessels have been represented by tubular objects (herein referred to as vessel representations). This example, described in more detail below, uses a variant of a minimum spanning tree algorithm to define vessel representation connections.

Before discussing the present example, two aspects relating to both vessels representation and vascular anatomy. First, the output of the tubular object representation method may be a set of 1-D central tracks in N-D space. Each point along the central track may have a cross-sectional extent associated with it. Although each vessel representation may have a direction, this direction may be determined by the extraction method and may not correctly model the direction of blood flow. It may therefore be desired for the tree-creation process to reverse the direction of some vessels and, in the case of some connections, to break a child vessel in two.

Second, "X" connections (trifurcations) do not normally occur in vascular anatomy. Any proposed connection between a pair of vessel representations therefore normally involves at least one vessel endpoint. Furthermore, the parent vessel is normally already attached at one end to its own parent or, in the case of roots, the direction of flow is predefined. Roots may generally be defined as large vessels which can carry a substantial amount of blood. In general, three connection types are therefore possible between a vessel pair: a) the parent's free end to the child's first point, b) the parent's free end to the child's last point, and c) the parent's free end to some point in the middle of the child. An embodiment of the invention may use three tables to store the costs of each of these three possible connections types for each parent-child considered. For purposes of this document, the cost may be any mathematical construct which can be minimized to determine the most probable connections among vessel representations. An example of one type of cost is provided below.

Figure 16:
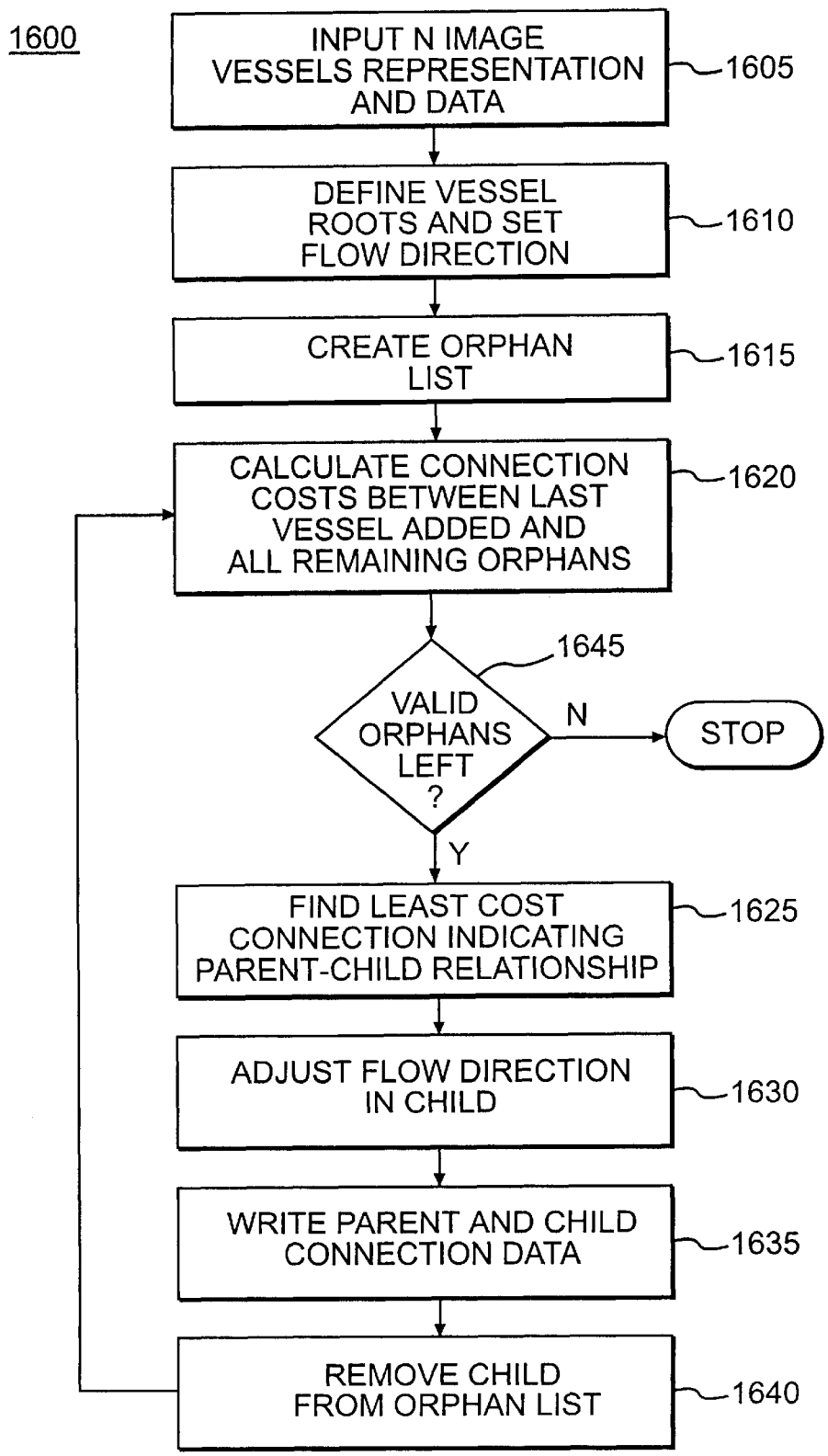
FIG. 16 is a flowchart showing an example of a method for creating symbolic representations of tubular objects and generating connectivity information.

FIG. 16 is a flowchart of a method according with an embodiment of the invention. Initially, data from N vessel representations and the image data associated with the representations are provided (step 1605). The next step in the process is to define vessel "roots" and set their flow direction (step 1610). For arterial circulation, roots are large, recognizable vessels that provide the source of blood to an anatomical area in question and whose direction of flow is toward the anatomical area of interest. For example, a normal arm contains only one root artery called the brachial artery. For the intracranial vasculature, definition of 3 roots is typically performed: the left carotid, the right carotid, and the basilar artery. Such root definition can be performed manually within a graphical user interface. For example, a user may identify at least one appropriate vessel using a mouse, keyboard, or other user-interface device known to those skilled in the art, and with the user interface reverse the direction of flow if the flow direction in a root vessel is initially incorrect. As discussed later, root definition can also be performed automatically for vessels associated with a particular anatomical region, but a specific means of root identification typically may be created for each anatomical region. Modifications designed to handle veins are discussed in a later section.

The next step in the process is to create an "orphan list" (step 1615). For this document, an orphan is defined as a vessel representations that is not connected to any other vessel representation. Initially, all vessel representations that are not roots are automatically defined as orphans and are added to the orphan list. An aspect of the vascular tree-creation example involves to searching among all orphans for the best possible connection to a growing vascular tree, making such a connection (which redefines the orphan as a "child"), and then removing the successful child from the orphan list.

Further referring to FIG. 16, an iterative process is then initiated that selects the best child candidate from among the available orphans and adds that child to a growing tree (steps 1620–1645). Iteration may continue until either the orphan list is empty or no orphan remains that meets minimum connectivity requirements. Each step in this iterative sequence is discussed in detail below.

Selection of the best child candidate from the orphan list depends upon a cost function that may include both a Euclidean distance measurement criterion and an image intensity criterion in the proposed region of connection. Other metrics for computing spatial relationships known in the art may also be used. These criteria can be used in isolation or in combination, but preferably the combination of the two is used.

The distance measurement defines a connection distance between any vessel pair according to the three possible connection types defined earlier: a) parent last point to child first point, b) parent last point to child last point, or c) parent last point to a point in the middle of the child. The distance reported may be subtracted by the radii of both the parent and child. As the vessel representation is generally complete, the connection distance generally measures a voxel or less for an appropriate connection. Connection distance of over 3 voxels may be regarded as automatic ground for exclusion of the proposed connection.

The image intensity criterion may seek for a cylinder that has appropriate image intensity value as compared to background and that extends between the proposed vessel connection points. The image intensity criterion may be expressed as a ratio between background image intensity and the average image intensity of the line connecting the proposed pair of connection points; for data sets in which vessels are of high intensity, a low image intensity ratio indicates a high probability of connection. As the distances in question are extremely short (three voxels or less) a straight line approximation of the vessel path may be reasonable. "Background" image intensity may be defined as the average image intensity of a hollow cylinder oriented along the same axis of the proposed connection and of radius 1 voxel greater than that of the child's radius. When vessels are of higher image intensity than background, an image intensity ratio of more than 0.7 may be regarded as grounds for automatic exclusion of the proposed connection.

The cutoff values for the proposed connection (three voxel distance and 0.7 image intensity ratio) may be arbitrary definitions that have been found effective for intracranial MRA data in order to define appropriate vessel connections and to eliminate noise, as discussed below. These constraints can be modified according to the noise level of the input image data type (3D rotational angiography tends to have less noise than MRA, for example), and the image intensity ratio may be inverted when the input data is of a type in which tubular objects are darker than background. Connections may not be allowed if the proposed connection exceeds any cutoff value.

Further referring to FIG. 16, the connection cost (determined by either distance, image intensity ratio, or both methods which is preferred) may be determined for each of the three possible connections between each new child added to the growing tree and all remaining orphans (step 1620). The cost of each of the 3 possible connections is inserted into the appropriate table holding the connection costs for that particular connection type.

Each iteration continues with a search of the three tables for the best allowable connection value (step 1625). The orphan list may then be checked to determine if there are any more valid orphans to process (step 1645). The iteration will terminate if all of the valid orphans have been processed; otherwise, the iteration will continue. If a valid orphan is found, both the child and parent vessels may be recorded, as is the table in which the value was found. Depending upon the table selected, the child's flow direction may be altered (step 1630). If the connection is to the child's first point, no flow redirection may be made. If the connection is to the child's last point, flow in the child may be reversed (implemented by reversing the order of the 1-D central track points and associated radii). If the connection is to a midpoint in the child, the child vessel is split in two, and flow direction may be reversed for the appropriate child segment.

Further referring to FIG. 16, the method then stores the connection information for the new parent-child combination (1635). While any data structures and programming languages known to those skilled in the art may be used, the embodiment preferably uses a C++ class, denoted herein as a "vessel" class, that contains not only the 1-D central track and radius data for each vessel representation, but that also stores additional connectivity information. These data structures, often referred to as classes, are symbolic representations of the vessel. Each vessel representation can be supplied a parent identification number (for example, default an invalid—1) and an ordered list of children and associated connection positions (default empty list). Addition of a new child may automatically insert the new child into the correctly ordered position in the parent's child list, and may automatically provide the child with the parent's ID number and connection point.

Further referring to FIG. 16, once a new child has been defined and connected to its parent, that child may be removed from the orphan list (step 1640). In subsequent program iterations, the new child can become parent to an even newer child selected from the list of remaining orphans.

A point to note about this method is that it may be highly successful in correctly including very small vessels while also eliminating almost all spurious segmented "vessels" that actually represent noise. MRA data sets may be noisy. Any attempt to extract vessels close to the limits of MRA resolution may also extract spurious tubular objects that actually represent noise. Previously described methods of extracting vessels from intracranial MRA data have had great difficulty in distinguishing small vessels from noise. The above-described example of defining vessel trees attempts to eliminate "X" connections (trifurcations), as well as possibly allowing close proximity of at least one endpoint between proposed child-parent pairs, and possibly producing independent confirmation of such connection in the actual image data. It may be rare for a spurious vessel actually representing noise to meet all of these criteria. The described method may serve two possible purposes: the definition of useful relationships between objects and the automatic exclusion of spurious objects which represent vessel noise.

Displaying and Editing Vascular Trees

One possible advantage of using representations of tubular objects is that it provides information about objects found in images which can be used to aid in the visualization of complex structures. While this embodiment of the invention is directed towards medical images containing vessels, it should be understood that the utility of this embodiment can extend to other medical contexts and also be generalized to other applications existing outside the medical context.

One potential embodiment of the invention includes a set of display methods that allow effective user interaction with the displayed image data in multiple ways. Graphical user interfaces, such as, for example, the one shown in FIG. 17, may be used to interactively manipulate vessel representations. Such manipulations can include selective display and color coding, which determine a vessel representation's connection information, a relationship of a vessel to a surface, measurements of tubular object's physical properties and possible branch structures.

The traditional method of displaying 3-D medical image data involves "volume rendering." Volume rendering may be defined as an approach that casts rays through a block of image data. Volume rendering processes all voxels sent to an image renderer on a voxel by voxel basis. The method is typically slow as it involves walking multiple rays through a volume of space, most of which may be unoccupied by objects of interest. The traditional method also typically does not permit user-directed identification of individual objects, querying of individual objects for information, or selective display of individual objects or groups of objects. Depth information is also not available on individual frames under the traditional method of maximum intensity projection (MIP) used for vessel display. As used herein, MIP is defined as a process where each pixel on the output image defines a ray that passes through 3-D image data from ray source to that pixel. The output image intensity value assigned to that pixel is the maximum image intensity value for the 3-D image data though which that ray passes. Objects of interest may also be frequently obscured by other objects present within the same volume.

Optionally, tubular object representation may be displayed more rapidly and effectively than MIP methods. One method of display is by "surface rendering." Surface rendering may be a process that coats the surface of each tubular object representation with triangles or quadrilaterals, and that can then draw each object rapidly under various coloring, shading, and lighting conditions. An embodiment of the invention included in a surgical planning program may employ this type of visualization. As stated above, each tubular object's symbolic representation may be represented as a data structure (preferably a C++ class) that includes not only an ordered list of points but also an ordered list of its children with attachment locations as well as its parental identification number and its attachment location on its parent. By traversing these data structures, it is thus possible to selectively show, hide, or change the color or opacity of an individual object or attached group of objects using a single user command.

Figure 17:
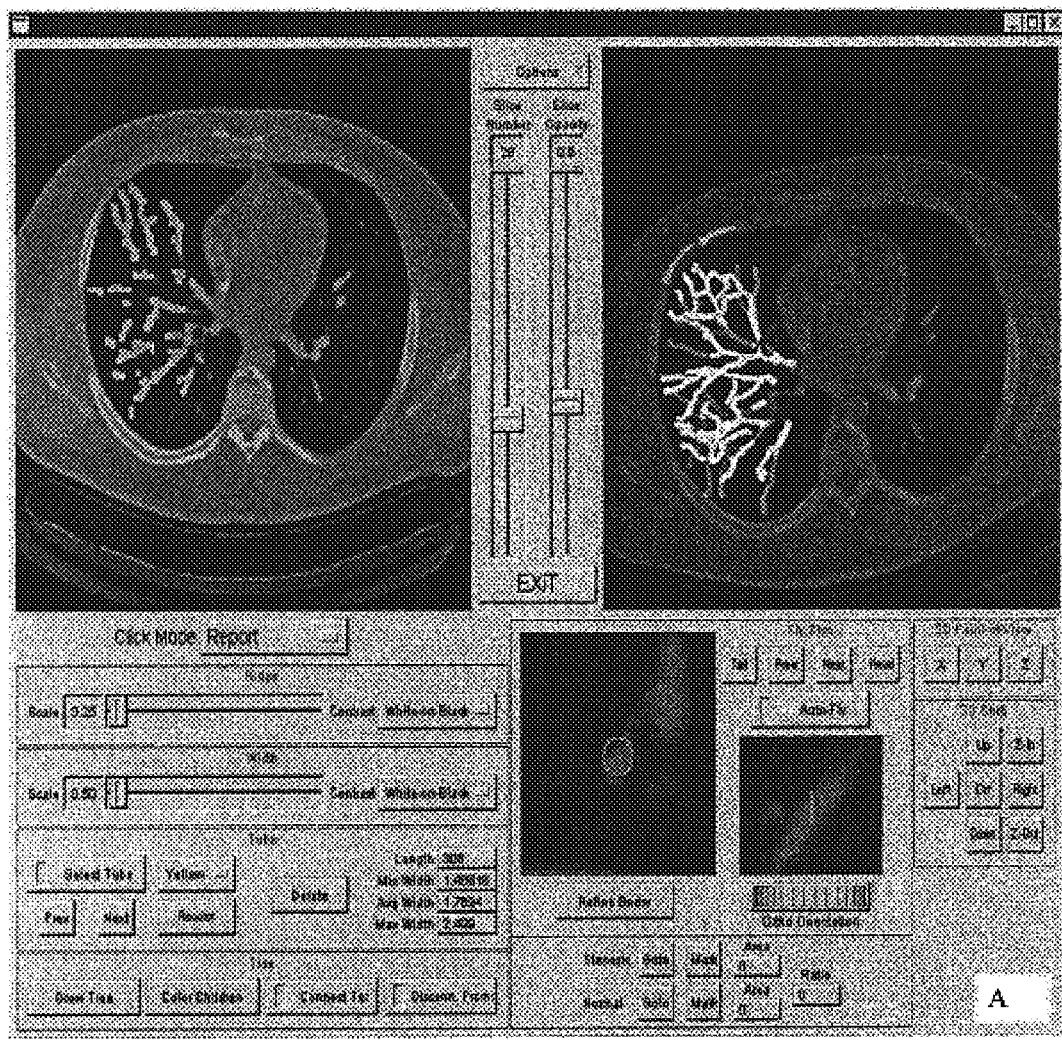
FIG. 17 shows an example of a graphical user interface for manipulating and analyzing representations of tubular objects in a lung.

An embodiment of the invention includes a surgical planning program which allows a user to load a set of vascular trees and to selectively color or hide any vessel or sub-tree with a single command. The program also may be able to simulate passage of a catheter through a vascular tree; as the user indicates along a vessel, only the distal portion of that vessel and the descendants of that distal portion may be shown. The user may also optionally load a set of MRA slices and show any slice in its proper 3-D location relative to the vasculature. Objects can be viewed interactively from any angle or distance. The skin surface can also be shown in relationship to the vasculature for surgical orientation. The program also may have the ability to display a tumor or arterio-venous malformations (AVMs) nidus in juxtaposition to the vasculature. The user can click on desired points on MRA slice data, which may be shown in a separate window, in order to define a rectangular volume that is then MIP volume rendered in its position relative to the vessels. An option to display the defined region as an ovoid is also available. The volume-rendered region can be shown at any opacity, thus allowing one to see the colored feeding vessels (and vessels within the volume) fading in and out. FIG. 17 shows some example visualizations according to an embodiment of the present invention.

In some cases, the user may want to edit the vascular structures so as to manually change the direction of flow in a part of the structure, to delete vessels permanently, or to change the parent-child connections for part of the structure. The surgical planning program may include a set of "point and click" editing tools that can be used, in combination with information obtained from different image modalities, such as, for example, digital subtraction angiograms (DSA), to exclude sub-trees or to redefine the parent of any tree or sub-tree. The same editing tools can also be used to correct errors if additional information is available. These same editing tools and display methods are applicable to connected tubular structures of any type and in any location in the body.

Another possible embodiment of the invention provides the ability to use tubular object representations to define boundaries used for volume rendering, thus allowing, for tubular object applications, volume rendering at approximately 10 times the speed of traditional methods and with the additional ability to manipulate image objects in effective fashion. The advantage of selective volume rendering over surface rendering is that the actual image data is shown.

In addition, there could also be the ability to show "fuzzy extraction boundaries" by arbitrary dilation of the radius associated with any vessel point so that, if the tubular object's representation accuracy is in doubt, a skeptical user can view an arbitrarily selected larger amount of the image data.

Methods of rapidly rendering vessel representations can be achieved by viewing each vessel point as a sphere and by: 1) front projection of each vessel's skeleton points onto a modified z-buffer that also records the vessel identification number, the point identification number, and the radius of the point, 2) if perspective projection is used, calculation of the length of the projected radius on the view-plane for each projected point, 3) creation of a circle on the view-plane for each projected point, and 4) back-projecting rays only through the indicated sphere of interest. If desired, possibly creating "fuzzy" extraction boundaries allowing more of the image data to be seen by arbitrarily multiplying the radius by any desired value.

Figure 18A:
FIG. 18A is an image of volumetric representation including a fuzzy boundary produced by a method according to an embodiment of the invention.
Figure 18B:
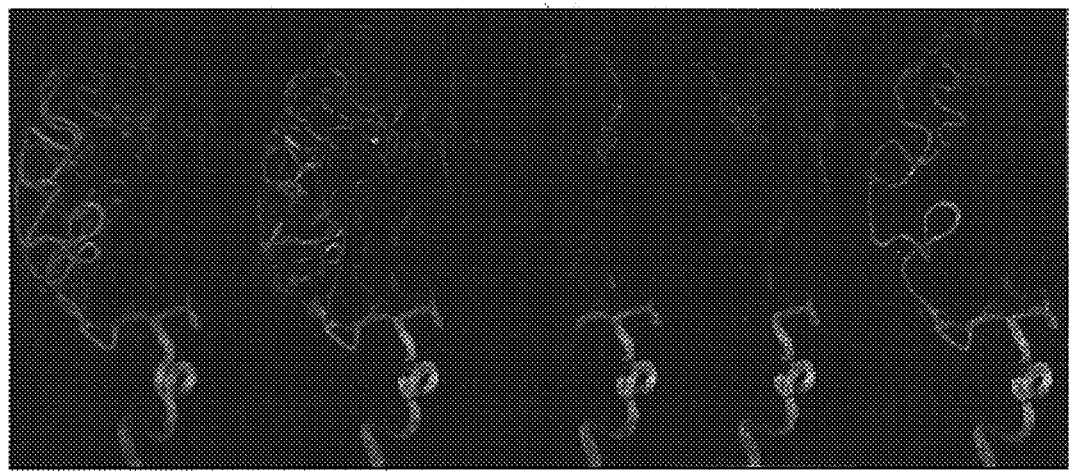
FIG. 18B is an image of volumetric representation showing selective display of vascular trees produced by a method according to an embodiment of the invention.

FIG. 18B illustrates a block volume rendering of a patient with an arterio-venous malformation as well as a volume rendering by one or more methods according to an embodiment of the invention. Simultaneous use of graph descriptions with the new volume rendering method may permit hiding an entire sub-tree with a single command, thus allowing clarification of the vascular feeding patterns to the lesion.

FIG. 18A illustrates the ability to show "fuzzy" lesion boundaries. The fact that a clinician can check the extraction against the actual image data may be reassuring to the clinician and may add a significant safety factor if 3-D volume visualizations are to be used for surgical planning. At the same time, the graph descriptions allow selective visualization of only the objects of interest, without obscuration by other objects.

N-D Tubular Object Registration

The registration of tubular objects in multi-dimensional images may be helpful in a variety of imaging applications, especially, for example, in the medical imaging field. N-D tubular object registration aligns the image elements of tubular objects between a source image and a destination image. The source image and destination image may be produced using different image modalities. An embodiment of the invention is directed to registration of tubular objects in N-D which may be used with a plurality of imaging modalities. Such imaging modalities may include, for example, MRA, computed tomography angiography (CTA), and N-D Doppler ultrasound, or other modalities known to those skilled in the art. N-D registration of tubular objects may be applicable, for example, in quantifying treatment effectiveness for arterio-venous malformations and organ transplant pre-operative planning.

The N-D registration of tubular objects may first utilize the 1-D central tracks and widths of the tubular objects in the source image or both images, as generated for example, by one or more embodiments of the invention described above, to quantify and direct the alignment of the source image with the destination image. Also as described above, these embodiments may produce a set of points defining the 1-D central track, cross-sectional extent estimates at each point, defined here as $r_i$, and vectors normal to the 1-D central track, defined here as $\vec{n}_{1i}$ and $\vec{n}_{2i}$.

The registration process may operate as an iterative refinement process. The source image is registered with a destination image by specifying a transformation function, T, that may have parameters that map the spatial location of the image elements in the source image to the spatial location of the corresponding image elements in the destination image. An iterative registration refinement method may use a metric to quantify the quality of the transformation. A metric derivative measure may be used to determine how to adjust the parameters of the transformation so as to improve the value of the metric and thereby improve the quality of the transformation and thereby the quality of the registration of the images. The iterative registration process may depend on the specification of initial transformation parameters that are close to the optimal transformation parameters.

In one possible embodiment, the transformation function is an affine transformation matrix that implements a linear mapping of the coordinates in one image to the coordinate in another. Transformation functions which utilize vector fields that perform a unique linear transformation for every point in the source image may also be used. The parameters of an affine transformation define how to scale, rotate, and shift the reference frames used to represent coordinates in the image.

A metric f may used to quantify the quality of the registration, as defined by a transformation T, of the extracted source-image tubes with the destination image data. The metric may use a sub-sampling of the 1-D central track representing the tubular objects in the source image to produce a sparse set of N points, defined here as $x_i$. Sub-sampling the 1-D central tracks may reduce the amount of time to perform the 3-D registration. A transformation function, T(●), is used to map points between the source image and the destination image. Each point along the sub sampled 1-D central track is transformed into the coordinates of the destination image, $I_d$, to create a set of transformed points $T(x_i)$ $I_d$ is filtered using a scale, $\sigma_i$, which is a multiple of the width of the tubular objects to be registered, i.e., $\sigma_i = \alpha r_i$, where $\alpha$ is a constant value which may range between 0 and 3, however it is typically set to 1. The metric f may be defined as $$f(T) = \sum_{i=1}^{N} I_{\sigma_i}(T(x_i)).$$

Local filtering of the destination image creates a central curve of intensity extrema if the point $x_i$ in the source image is transformed to a tubular object in the destination image. If $\alpha$ is increased beyond 1, the capture radius of the metric may increase, the effect of image noise may decrease, and larger tubular objects may be given additional emphasis in determining the quality of the registration. By starting with a large $\alpha$ and decreasing it to 1 as the registration process iterates, a course to fine registration strategy is effected.

One advantage of this embodiment of the invention may be the implementation of a derivative of the metric f which directs the update of the transformation parameters. This embodiment of the derivative of the metric reduces the number of local maxima of the registration metric found by limiting the influence of each point $x_i$ on the movement of the metric to the space specified by its normal vectors T($\vec{n}_{1i}$) and T($\vec{n}_{2i}$). When the tubular objects in both images are aligned, this may prevent the source image points from affecting the transformation parameters so as to cause those points to move along the destination image's corresponding tubular objects' 1-D central tracks. When tubular objects in both images are misaligned, limiting the search keeps points from being influenced by 1-D central tracks that are not properly oriented. Where J(●) is the Jacobian operator, the gradient of the metric f may be determined by:

$$\nabla f(T) = \frac{\sum_{i=1}^{N} J(T) \nabla I_{\sigma_i}(T(x_i))(T(\vec{n}_{1i}) + T(\vec{n}_{2i}))}{\sum_{i=1}^{N} (T(\vec{n}_{1i}) + T(\vec{n}_{2i}))}.$$

A preferred application of these metric and metric gradient functions is for the registration of detailed 3-D images with less-detailed 3-D images. The level-of detail of any image is determined by the application. Generally, the high-detailed image contains more information necessary for performing one aspect of a task compared to the amount of information available for performing that task in the other image. Furthermore, it may be that details in both images must be considered together to perform a particular task. The detailed image may be more difficult, costly, or time consuming to acquire. The detailed image may contain information not found in the less-detailed image. Both images may contain tubular objects. The tubular object representation and registration methods can be used to align these image data even if these image data were acquired from different points of view, at different times, from different instances that contain nearly the same objects, or from different types of image collection methods. After registration, any details, objects, or data in the high detail image can be mapped into the coordinates of the less-detailed image. Similarly, any details, objects, or data in the less-detailed image can be mapped into high detailed image.

A medical application example of the registration of high-detail and less-detailed data is the registration of pre-operative CT or MR data with intra-operative ultrasound data for radio-frequency ablation treatment of liver lesions. The pre-operative CT data may depict a liver lesion. That liver lesion may not appear in the intra-operative ultrasound images. As a result, a radio frequency probe may not be directly guided to lesion using the ultrasound images alone. The ultrasound image depicts the radio frequency probe with respect to the patient's vasculature. The CT image depicts the lesion with respect to the patient's vasculature. Using the embodied tubular object extraction method to extract the representations of the central curves of the vessels in the CT data, the embodied tubular object registration method can align the CT images with the intra-operative ultrasound data. Once registered, the radio frequency probe can be mapped to the CT image to measure or visualize its relationship to the lesion already visible in the CT image, or the lesion can be mapped from the CT image to the ultrasound data so that its relationship to the probe can be measured or visualized. This registration can account for patient movement, ultrasound probe movement, liver (or other organ) movement, and change in organ/patient shape/size which may be due to breathing, drugs, radiation, time or other short term or long term physical or chemical or other influences.

Another medical application example of the registration process is for tracking the change in lesions, organs, or other features in a patient over time. Each time the patient images are acquired, they can be registered with the previously acquired image. The affects of drugs, radiation treatment, or time on the size, shape, location or number of lesions, organs, or other features can then be visually compared, shown together as overlays, measured simultaneously, or otherwise processed or displayed simultaneously by any methods known to one reasonably skilled in the art.

Automated Determination of Flow Direction in the Circle of Willis

In some areas of the body, blood vessels may not be organized as trees. Instead one or more vessels may provide a circular loop in which the direction of blood flow is uncertain and may vary from patient to patient. One example is at the base of the skull, where the "Circle of Willis" connects the carotid and the basilar circulations. The Circle of Willis is highly variable, and the direction of flow within various parts of this loop is different from patient to patient.

The vascular extraction process only provides geometrical information. Flow information is not available directly. Although interactive tools, described above, have been developed that permit the user to delete or reassign parentage to trees and sub-trees by interactive methods, it would be preferable if flow direction in the Circle of Willis and other similar areas could be determined automatically.

One means of accomplishing this uses the fact that arterial flow is generally directed from larger arteries into smaller ones. By using the diameters and lengths of the vessels entering the loop, exiting the loop, and comprising the loop, it could be possible to model blood flow as a set of pipes each containing a particular resistance. As inflow to each pipe should equal that pipe's outflow, a likely determination of blood flow direction within the loop itself can be provided.

Implementation of this approach may include automatic identification of particular branches (for example, for the intracranial circulation, such implementation would utilize the identification of the posterior communicators, P1 segments, A1 segments, and anterior communicator, as well as the carotid and basilar arteries) and their associated widths, using anatomical knowledge implemented as heuristics. In general, once the major inflow arteries have been defined (for the intracranial circulation, the carotid arteries and the basilar), this information can be used to help search for the remaining portions of the vascular network in question. The preferred approach could be that of a cost minimization vessel search as discussed earlier, but here also combined with the automated branch-point recognition provided by the tubular object representation extraction process.

Deformations by tumor may not affect the proposed approach, as, once root vessels are identified, only large branches may be sought originating from and connecting these roots in expected fashion. The vessel extraction process, given an initial seed point, provides a 1-D central track that curves with the vessel, no matter how that vessel is deformed. Evaluation of the methodology can be done against DSA data obtained from the same patient.

Separation of Arteries from Veins and Automatic Identification of Feeding Vessels For surgical planning purposes, it is often important to discriminate arteries from veins. In addition, when dealing with tumors or arterio-venous malformations (AVM) anywhere in the body, a the surgeon may to know which vessels terminate within the lesion and which vessels may have branches that extend beyond the lesion to supply normal anatomy.

Figure 19:
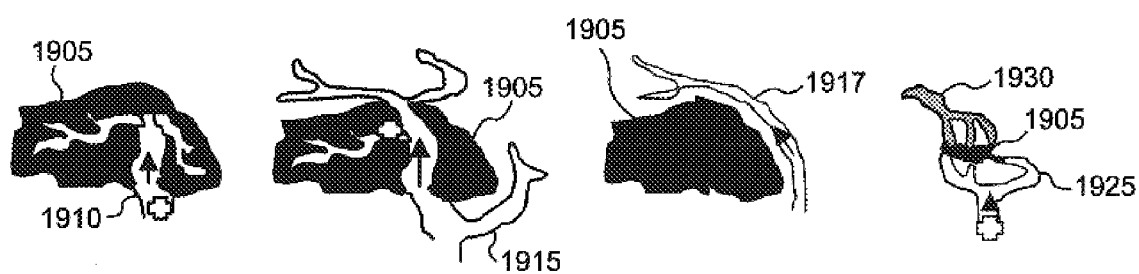
FIG. 19 is a diagram showing the different types of vascular structures associated with an arterio-venous malformation or tumor.

FIG. 19, identifies four vessel categories: 1) feeding arteries that enter (1910, 1925) a tumor/AVM nidus (1905), 2) arteries that pass through the tumor/AVM nidus (1905) or possess branches that feed a normal brain (1915), 3) vessels unrelated to the lesion (1917), and 4) veins of passage or exit (1930). Certain methods may permit automated classification of vessels into these categories.

While the following discussion applies to intracerebral circulation, the general approach may be applicable to any body area. The intracerebral venous system consists of a set of vascular trees, as does the arterial circulation. There typically are fewer veins, and veins have a less complex and plethoric branching system. The major, named veins are also located in reasonably constant locations. The venous and arterial circulations are normally connected by capillaries, microscopic vessels too small to be distinguished by even DSA. Within an AVM nidus, however, the arterial and venous circulations may connect directly with each other via vessels large enough to be discriminated by MRA. Tree definition normally does not discriminate veins from arteries, and a growing arterial tree will connect directly to veins within the AVM.

The following method may accomplish the separation process:

1. Given definition of a lesion surface by any arbitrary method, automatic division of vessels into 5 categories relative to the lesion surface: a) those entirely inside the lesion, b) those entirely outside the lesion, c) those passing through the lesion, d) those entering the lesion from outside and terminating within it, and e) those originating within the lesion and terminating outside it.
2. Tree definition beginning with one or more venous roots, with the rule that venous connections may not extend within the confines of the lesion (thus preventing extension into the arterial system).
3. Tree definition from the desired arterial roots.
4. A subsequent automatic classification of all vessels into the categories shown in FIG. 19, given the known location of each parent-child connection and the vascular division into bins under step 1.
5. Automation of the entire process, through an atlas-based search of venous roots.

Intravenous Path Planning, Surgical Simulation, and Intra-Operative Guidance:

The vessel representations formed by applying the disclosed method to MRA or CTA data may accurately and consistently estimate the positions of a patient's vessels. Using set and graph operations (joining, splitting, branching, etc.) on those representations, vascular trees can be defined, by visualizing and quantifying those trees, the best intravenous (i.e., catheter) approach to a pathology can be determined, the placement of an intravenous device can be determined (i.e., for embolization), vessel curvature information can be used to control a force-feedback device as part of a catheter insertion simulation system, and the location of a catheter can be estimated by combining measurements made during a procedure with the representations formed.

Small Bowel Obstruction Detection:

The small bowel of a patient can be represented by applying the disclosed method to CT data acquired with contrast. The bowel's intensity profile can be easily measured with respect to the representations. Small bowel obstructions can be seen as bowel sections with reduced cross-sectional area or as having a set of concentric rings of contrast.

Removing Specific Tubular Structures from Medical Images to Increase the Conspicuity of Pathologies Tubular objects are prevalent in human anatomy and thereby can confound the detection of pathologies. If those pathologies are non-tubular or differ from surrounding tubes in a specific manner, the pathologies can be automatically detected or made more obvious. Such is the case with removing vessels from chest radiographs for the detection of nodules, vessels and ducts from mammograms for the detection of masses and micro-calcifications, and vessels and bronchi from chest CT for the detection of lung cancers and nodules.

Registration: Pre and Post Operative Patient Anatomy via Vessels to Determine Post-Operative Radiation Therapy Treatment Margins The premise is that pre and post operative registration of the remaining portions of an organ after the surgical resection of a tumor is most accurate if the vasculature within the organ is used as the basis of registration. For example, by specifying tumor margins with respect to local vasculature positions, the new position of the tumor margins after tumor removal can be best judged based on how the local vasculature moved.

Donor Selection for Living-Donor Partial Liver Transplant Planning

The complexity of the resection surface to separate the lobes of a liver can be determined by the arrangement of vessels in the liver. The symbolic representations enable the automatic estimation of the surgical resection surface for a living donor given pre-operative MR or CT. Visualizing and quantifying that surface can aid in the selection of potential donors.

Automatic Data Analysis—Various Applications

Utilizing an embodiment according to the invention, the detection of faults in a computer chip can be determined to aid in design and manufacturing of integrated circuits. By utilizing an image of the etchings on a computer chip, representations of those etchings can be represented by tubular objects using the disclosed method and the search for small scale breaks in those etchings can be appropriately directed.

Utilizing an embodiment according to the invention, stenosis identification and quantification can be performed using CTA images. Stenosis is defined herein as a narrowing of a vessel due to the build-up of plaque on a vessel wall or by pressure from a neighboring object. By representing vessels with tubular objects and then estimating their cross-sectional areas using techniques of the disclosed method, the ratio of the area at a stenosis versus the area of the surrounding vessel segments defines the degree of a stenosis.

Utilizing an embodiment according to the invention, estimation of a patient's risk of stroke can be accomplished by developing a 3-D representation of the shape of the stenosis from CTA—if a small cavity exists in the stenosis, the risk of stroke increases.

Utilizing an embodiment according to the invention, reverse-engineering a circuit can be performed given an image of the connections on a printed circuit board, the lines between connections can be automatically followed and analyzed.

Utilizing an embodiment according to the invention, existing maps provided in hardcopy form can be digitized and the tubular objects represented therein may be analyzed in a highly efficient manner. Given the wealth of various natural and man-made structures, such as, for example, terrain, sewer, phone, and power line layouts that may exist only in drawings, their conversion to a functional electronic format (versus merely a static image) can be automated by the disclosed method.

Utilizing an embodiment according to the invention, branch angles in arteries can be measured utilizing vessel representations. Knowledge of the branch angles of arteries may aid in predicting the outcome of the placement of an aortic shunt.

Utilizing an embodiment according to the invention, nano-tube buckling analysis can be performed through tubular object representation in electron microscopy images. Carbon nano-tubes have potentially significant physical properties associated with the force required to make them buckle. The effect of various forces and the occurrence of buckling can be quantified.

Additional Visualization Applications

Utilizing an embodiment according to the invention, images of a lung may be analyzed to aid in planning the resection of a lung lobe from one patient for transfer to another. Lung lobe transplantation utilizes knowledge of the vessels and bronchi that support the lung lobe. The disclosed method may provide a visualization in which both of these structures can be simultaneously visible (intensity windowing a CT image can disclose one or the other structure, preferably not both simultaneously). This technique could be applied to the transplantation of other organs in addition to the lung. FIG. 17 illustrates selective removal of tubular objects.

Utilizing an embodiment according to the invention, a virtual fly-thru of the bowel may be performed. The detection of polyps via the virtual fly-thru of the bowel (as imaged by CT with contrast) has received much research attention. The disclosed method may provide an automated means for specifying a path for the virtual fly-thru experience Other embodiments of the invention will be apparent to those skilled in the art. It is intended that the specification and examples be considered as exemplary only.

What is claimed:

1. A method for processing at least one tubular object in a multi-dimensional image, comprising:
    (a) establishing a seed point in a multi-dimensional image;
    (b) searching for an extremum point corresponding to a tubular object having a central curve of intensity extrema;
    (c) extracting: a) a one-dimensional central track corresponding to the tubular object, and b) extents corresponding to a plurality of cross-sections along the tubular object, wherein the plurality of cross-sections intersects the one-dimensional central track;
    (d) convolving intensities of image elements within a vicinity of the extremum point with a filter to create the central curve of intensity extrema;
    (e) computing a first set of normal vectors at a first position corresponding to the extremum point, the first set of normal vectors being substantially orthogonal to the one-dimensional central track;
    (f) computing a first tangent vector at the first position, the first tangent vector being substantially parallel to the one-dimensional central track;
    (g) traversing to a second position by stepping from the first position in the direction along the tangent vector using a step size;
    (h) computing a second set of normal vectors at the second position, the second set of normal vectors being substantially orthogonal to the one-dimensional central track;
    (i) computing a second tangent vector at the second position, the second tangent vector being substantially parallel to the one-dimensional central track;
    (j) determining a proximity of the first position and the second position;
    (k) searching for an intensity maximum in a space defined by the first set of normal vectors when the second position is not substantially coincident with the central curve of intensity extrema; and
    (l) determining whether at least one stop traversing criteria is met.

2. The method of claim 1, wherein the determining a proximity further includes:
   (a) reducing the step size; and
   (b) repeating the establishing a second position, the computing a second set of normal vectors, and the computing a second tangent vector.

3. The method of claim 1, wherein the step size is less than a dimensional extent represented by each one of the image elements.

4. The method of claim 1, wherein the searching for an intensity maximum further includes:
   (a) computing a third position corresponding to the intensity maximum; and
   (b) replacing the second position with the third position.

5. The method of claim 1, further comprising:
   (a) replacing the first position by the second position; and
   (b) repeating the extracting based on the at least one stop traversing criteria not being met.

6. The method of claim 1, wherein the computing the first and second set of normal vectors, the computing the first and second tangent vectors, and the determining whether at least one termination criteria is met includes computing the eigenvectors and eigenvalues of a Hessian.

7. The method of claim 1, wherein the filter is a Gaussian with a dynamic scale, and wherein the method further comprises:
   (a) computing an extent of the cross-section corresponding to the tubular object at the second position when the second position is substantially coincident with the one-dimensional central track; and
   (b) varying a dynamic scale based upon the computed extent.

8. The method of claim 7, further comprising:
   (a) computing a plurality of extents of cross-sections corresponding to the tubular object at points along the one-dimensional central track, based upon the at least one stop traversing criteria not being met; and
   (b) producing an ordered set of values representing locations of the one-dimensional central track in a reference associated with the multi-dimensional image.

9. The method of claim 8, wherein the cross-sections are substantially perpendicular to the one-dimensional central track.

10. The method of claim 9, further comprising: generating a surface rendering illustration of a representation of the tubular object for display, the surface generating utilizing the one-dimensional central track and the extents of cross-sections.

11. The method of claim 9, further comprising: restricting the visualization of the elements of the image to one of inside and outside the tubular objects using the one-dimensional central track and the extents of cross-sections.

12. The method of claim 9, further comprising: positioning one of a volume and a surface rendering for display utilizing the one-dimensional central track.

13. The method of claim 12, wherein the central track is used to define a sequence of positions, wherein the order of the sequence defines a directionality of the one-dimensional central track.

14. The method of claim 8, wherein the computing includes utilizing a medialness functions centered on a point of interest on the one-dimensional central track.

15. The method of claim 14, wherein the medialness function utilizes boundary operators which include a plurality of pairs of spherical operators located at ends of a plurality of radii, the radii being distributed about the cross-section of the tubular object and having a common starting point at the point of interest one the one-dimensional central track.

16. The method of claim 14, further comprising:
   (a) computing a plurality of extents of the tubular object, each orthogonal to the one-dimensional central track, at a plurality of locations on the one-dimensional central track on either side of the point of interest on the one-dimensional central track; and
   (b) combining the plurality of extents of the tubular object to compute a measure of the extent at the point of interest.

17. The system of claim 1, wherein the filter is a Gaussian with a dynamic scale, and wherein the system further comprises:
   (a) computing an extent of the cross-section corresponding to the tubular object at the second position when the second position is substantially coincident with the one-dimensional central track; and
   (b) varying a dynamic scale based upon the computed extent.

18. The system of claim 17, further comprising additional instructions to be executed by the computer processor for:
   (a) computing a plurality of extents of cross-sections corresponding to the tubular object at points along the one-dimensional central track, based upon the at least one stop traversing criteria not being met; and
   (b) producing an ordered set of values representing locations of the one-dimensional central track in a reference associated with the multi-dimensional image.

19. The system of claim 18, wherein the cross-sections are substantially perpendicular to the one-dimensional central track.

20. The system of claim 19, further comprising additional instructions to be executed by the computer processor for: generating a surface rendering illustration of a representation of the tubular object for display, the surface generating utilizing the one-dimensional central track and the extents of cross-sections.

21. The system of claim 19, further comprising additional instructions to be executed by the computer processor for: restricting the visualization of the elements of the image to one of inside and outside the tubular objects using the one-dimensional central track and the extents of cross-sections.

22. The system of claim 19, further comprising: positioning one of a volume and a surface rendering for display utilizing the one-dimensional central track.

23. The system of claim 22, wherein the central track is used to define a sequence of positions, wherein the order of the sequence defines a directionality of the one-dimensional central track.

24. The system of claim 18, wherein the computing includes utilizing a medialness functions centered on a point of interest on the one-dimensional central track.

25. The system of claim 24, further comprising additional instructions to be executed by the computer processor for:
   (a) computing a plurality of extents of the tubular object, each orthogonal to the one-dimensional central track, at a plurality of locations on the one-dimensional central track on either side of the point of interest on the one-dimensional central track; and
   (b) combining the plurality of extents of the tubular object to compute a measure of the extent at the point of interest.

26. The system of claim 24, wherein the medialness function utilizes boundary operators which include a plurality of pairs of spherical operators located at ends of a plurality of radii, the radii being distributed about the cross-section of the tubular object and having a common starting point at the point of interest one the one-dimensional central track.

27. A system for processing at least one tubular object in a multi-dimensional image, comprising:
(a) a computer processor; and
(b) a memory functionally coupled to the computer processor, wherein the memory stores a multi-dimensional image and instructions to be executed by the computer processor, for:
(i) establishing a seed point in the multi-dimensional image;
(ii) searching for an extremum point corresponding to a tubular object having a central curve of intensity extrema
(iii) extracting: a) a one-dimensional central track corresponding to the tubular object, and b) extents corresponding to a plurality of cross-sections along the tubular object, wherein the plurality of cross-sections intersects the one-dimensional central track;
(iv) convolving intensities of image elements within a vicinity of the extremum point with a filter to create the central curve of intensity extrema;
(v) computing a first set of normal vectors at a first position corresponding to the extremum point, the first set of normal vectors being substantially orthogonal to the one-dimensional central track;
(vi) computing a first tangent vector at the first position, the first tangent vector being substantially parallel to the one-dimensional central track;
(vii) traversing to a second position by stepping from the first position in the direction along the tangent vector using a step size;
(viii) computing a second set of normal vectors at the second position, the second set of normal vectors being substantially orthogonal to the one-dimensional central track;
(ix) computing a second tangent vector at the second position, the second tangent vector being substantially parallel to the one-dimensional central track;
(x) determining a proximity of the first position and the second position;
(xi) searching for an intensity maximum in a space defined by the first set of normal vectors when the second position is not substantially coincident with the central curve of intensity extrema; and
(xii) determining whether at least one stop traversing criteria is met.

28. The system of claim 27, wherein the determining a proximity further includes:
(a) reducing the step size; and
(b) repeating the establishing a second position, the computing a second set of normal vectors, and the computing a second tangent vector.

29. The system of claim 27, wherein the step size is less than a dimensional extent represented by each one of the image elements.

30. The system of claim 27, wherein the searching for an intensity maximum further includes:
(a) computing a third position corresponding to the intensity maximum; and
(b) replacing the second position with the third position.

31. The system of claim 27, further comprising additional instructions to be executed by the computer processor for:
(a) replacing the first position by the second position; and
(b) repeating the extracting based on the at least one stop traversing criteria not being met.

32. The system of claim 27, wherein the computing the first and second set of normal vectors, the computing the first and second tangent vectors, and the determining whether at least one termination criteria is met includes computing the eigenvectors and eigenvalues of a Hessian.

* * * * *

UNITED STATES PATENT AND TRADEMARK OFFICE
CERTIFICATE OF CORRECTION

PATENT NO. : 6,690,816 B2  Page 1 of 1
DATED : February 10, 2004
INVENTOR(S) : Stephen R. Aylward et al.

It is certified that error appears in the above-identified patent and that said Letters Patent is hereby corrected as shown below:

<u>Column 1,</u>
Line 3, please add
-- GOVERNMENT INTEREST
This invention was made with Government support under Grant No. CA67812 awarded by the National Insttitutes of Health. The Government has certain rights in the invention. --

Signed and Sealed this

Twenty-second Day of June, 2004

JON W. DUDAS
*Acting Director of the United States Patent and Trademark Office*